(12) United States Patent
You et al.

(10) Patent No.: US 12,337,757 B2
(45) Date of Patent: Jun. 24, 2025

(54) METHOD AND DEVICE FOR PROVIDING FEEDBACK FOR SAFE WALKING

(71) Applicant: Samsung Electronics Co., Ltd., Suwon-si (KR)

(72) Inventors: Juyeon You, Suwon-si (KR); Kyusung Kim, Suwon-si (KR); Soojung Bae, Suwon-si (KR); Yongjun Lim, Suwon-si (KR); Hyungmin Cho, Suwon-si (KR); Woonkee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 18/347,276

(22) Filed: Jul. 5, 2023

(65) Prior Publication Data

US 2023/0347821 A1     Nov. 2, 2023

Related U.S. Application Data

(63) Continuation of application No. PCT/KR2021/016344, filed on Nov. 10, 2021.

(30) Foreign Application Priority Data

Jan. 11, 2021  (KR) .................. 10-2021-0003408

(51) Int. Cl.
*B60Q 9/00*      (2006.01)
*B60R 16/03*     (2006.01)
(Continued)

(52) U.S. Cl.
CPC .............. *B60Q 9/008* (2013.01); *B60R 16/03* (2013.01); *G06F 3/013* (2013.01); *G06V 20/58* (2022.01)

(58) Field of Classification Search
CPC . B60Q 9/008; B60Q 1/48; B60Q 1/50; B60Q 5/006; B60Q 1/525; B60Q 2400/50;
(Continued)

(56) References Cited

U.S. PATENT DOCUMENTS 9,975,483 B1    5/2018  Ramaswamy
10,078,966 B2   9/2018  Kim et al.
(Continued)

FOREIGN PATENT DOCUMENTS

KR   10-2017-0018703 A    2/2017
KR       10-1741500 B1    5/2017
(Continued)

OTHER PUBLICATIONS

International Search Report with Written Opinion dated Feb. 17, 2022; International Patent Application No. PCT/KR2021/016344.
(Continued)

*Primary Examiner* — Michael E Teitelbaum
(74) *Attorney, Agent, or Firm* — Jefferson IP Law, LLP

(57) ABSTRACT

A device is provided that includes a vision camera, a sensor module, a communication module, an output module, a memory, and a processor operatively connected to the vision camera, the sensor module, the communication module, the output module, and the memory. The processor is configured to connect to an external electronic device via the communication module, receive, from the external electronic device, location information of the external electronic device and determine an expected moving path, recognize an obstacle on the expected moving path based on at least one of the location information of the external electronic device, an image acquired from the vision camera, a sensor value acquired from the sensor module, and information collected from another device located on a road through the communication module, and determine risk of collision between the
(Continued)

external electronic device and the obstacle so as to provide a risk notification through the output module.

17 Claims, 13 Drawing Sheets

(51) Int. Cl.
   *G06F 3/01* (2006.01)
   *G06V 20/58* (2022.01)

(58) Field of Classification Search
   CPC ......... B60R 16/03; G06F 3/013; G06V 20/58; G06V 10/82; G08G 1/163; G08G 1/005; G08G 1/165; G08G 1/166; H04W 4/02; H04W 4/40; H04W 4/38; B60W 10/06; B60W 50/14; B60W 30/08; B60W 2050/0005; B60W 2050/143; B60W 2050/146; B60W 2420/403; B60W 2420/54; B60W 2552/50; B60W 2556/45; B60Y 2300/08; B60Y 2400/30
   See application file for complete search history.

(56) References Cited

U.S. PATENT DOCUMENTS

| | | | |
|---|---|---|---|
| 10,373,504 B2 | 8/2019 | Ahn et al. | |
| 10,547,988 B2 | 1/2020 | Oh et al. | |
| 10,717,413 B2 | 7/2020 | Lane et al. | |
| 10,818,183 B2 | 10/2020 | Sung et al. | |
| 2005/0073438 A1 | 4/2005 | Rodgers et al. | |
| 2015/0035685 A1* | 2/2015 | Strickland | B60Q 9/008 340/901 |
| 2016/0363665 A1* | 12/2016 | Carlson | B62J 50/225 |
| 2017/0092126 A1* | 3/2017 | Oshida | G08G 1/005 |
| 2019/0351764 A1* | 11/2019 | Gil Vera | B60R 11/0241 |
| 2020/0047668 A1 | 2/2020 | Ueno et al. | |
| 2020/0198572 A1 | 6/2020 | Kim et al. | |
| 2020/0398743 A1 | 12/2020 | Huber et al. | |

FOREIGN PATENT DOCUMENTS

| | | |
|---|---|---|
| KR | 10-2017-0064907 A | 6/2017 |
| KR | 10-2017-0112862 A | 10/2017 |
| KR | 10-2018-0021469 A | 3/2018 |
| KR | 10-2018-0065215 A | 6/2018 |
| KR | 10-2019-0059497 A | 5/2019 |
| KR | 10-2019-0100614 A | 8/2019 |
| KR | 10-2020-0039065 A | 4/2020 |
| KR | 10-2020-0113967 A | 10/2020 |

OTHER PUBLICATIONS

Extended European Search Report dated May 17, 2024; European Appln. No. 21917864.7-1206 / 4261094 PCT/KR2021016344.

* cited by examiner

METHOD AND DEVICE FOR PROVIDING FEEDBACK FOR SAFE WALKING

CROSS-REFERENCE TO RELATED APPLICATION(S)

This application is a continuation application, claiming priority under § 365(c), of an International application No. PCT/KR2021/016344, filed on Nov. 10, 2021, which is based on and claims the benefit of a Korean patent application number 10-2021-0003408, filed on Jan. 11, 2021, in the Korean Intellectual Property Office, the disclosure of which is incorporated by reference herein in its entirety.

BACKGROUND

1. Field

The disclosure relates to a method and a device for providing feedback to support safe walking to a user while moving in a vehicle.

2. Description of Related Art

With the development of digital technology, various types of electronic devices such as mobile communication terminals, personal digital assistants (PDAs), electronic notebooks, smart phones, tablet personal computers (PCs), and wearable devices are widely used. For example, the electronic device may be connected to a wireless earphone wearable on the user's ear to output sound of music or video through the wireless earphone. Alternatively, the electronic device may be connected to the wearable display device (e.g., AR glasses, smart glasses) to provide various contents to which extended reality (XR) technologies such as virtual reality (VR), augmented reality (AR), and/or mixed reality (MR) are applied through the wearable display device.

On the other hand, vehicles are evolving not only to improve their performance as means of transportation, but also to improve various functions related to driver's safe driving. As an example, development of an advanced driver assistance system (ADAS) or an autonomous vehicle is being actively conducted. For example, a vehicle may acquire various types of information from the outside through a wireless communication module, process the acquired information to support safe driving of a driver, and provide information to enable autonomous driving.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and devices for connecting an electronic device and a vehicle by using short-range communication when nearby obstacles are detected through sensors of the electronic device and a user enters within a predetermined distance from a vehicle, identifying an expected moving path based on information acquired from the advanced driver assistance system (ADAS) of the vehicle, advanced pedestrian assistance systems (APAS) of the electronic device, and sensors of the electronic device, or recognizing nearby obstacles and providing a warning notification to the user through the electronic device or the vehicle based on collision with obstacles.

Additional aspects will be set forth in part in the description which follows and, in part, will be apparent from the description, or may be learned by practice of the presented embodiments.

In accordance with an aspect of the disclosure, an electronic device is provided. The electronic device includes a vision camera, a sensor module, a communication module, an output module, a memory, and a processor operatively connected to the vision camera, the sensor module, the communication module, the output module, and the memory, wherein the processor may be configured to connect to an external electronic device through the communication module, receive location information of the external electronic device and determine an expected moving path, recognize an obstacle on the expected moving path based on at least one of the location information of the external electronic device, an image acquired from the vision camera, a sensor value acquired from the sensor module, or information collected from another device located on a road through the communication module, and determine risk of collision between the external electronic device and the obstacle and provide a risk notification through the output module.

In accordance with another aspect of the disclosure, an electronic device is provided. The electronic device includes a sensor module, a vision camera, a communication module, a location recognition module, a memory, and a processor operatively connected to the sensor module, the vision camera, the communication module, the location recognition module, and the memory, wherein the processor may be configured to acquire location information of the electronic device by using the location recognition module, identify an expected moving path based on location information of a vehicle stored in the memory and the acquired location information, recognize an obstacle on the expected moving path based on at least one of the location information of the external electronic device, an image acquired from the vision camera, or a sensor value acquired from the sensor module, provide a risk notification based on the recognized obstacle, connect to the vehicle in case of entering within a predetermined distance from the vehicle according to movement of the electronic device, and provide a risk notification through the vehicle.

In accordance with another aspect of the disclosure, a method performed by an electronic device is provided. The method includes connecting to an external electronic device through a communication module of the electronic device, determining an expected moving path by receiving location information of the external electronic device from the external electronic device, recognizing an obstacle on the expected moving path based on at least one of the location information of the external electronic device, an image acquired from the vision camera of the electronic device, a sensor value acquired from a sensor module of the electronic device, or information collected from another device located on a road through the communication module, and determining risk of collision between the external electronic device and an obstacle and providing a risk notification through the output module of the electronic device.

According to various embodiments, a user may be protected from nearby dangerous obstacles by using not only various sensors installed in a vehicle but also various types of information acquired from the electronic device.

According to various embodiments, until the electronic device and the vehicle are connected, the electronic device may directly recognize nearby dangerous obstacles and determine whether there will be a collision with nearby dangerous obstacles for warning, and when the electronic device and the vehicle are connected, the electronic device or the vehicle may warn of a risk of collision with dangerous obstacles around the user, respectively through information exchange between the electronic device and the vehicle.

According to various embodiments, in a situation that the user is using the electronic device and may not face the surroundings, when the electronic device recognizes the situation and determines that the user may be exposed to the risk of an accident, the sensors of the surrounding devices operate, and when the danger is detected, a feedback may be provided to the user.

According to various embodiments, when the user gets in or out of the vehicle, the advanced pedestrian assistance system (APAS) is executed through the electronic device possessed by the user and the advanced driver assistance system (ADAS) of the vehicle is executed, so that dangerous elements may be detected from all directions with the user as a central point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
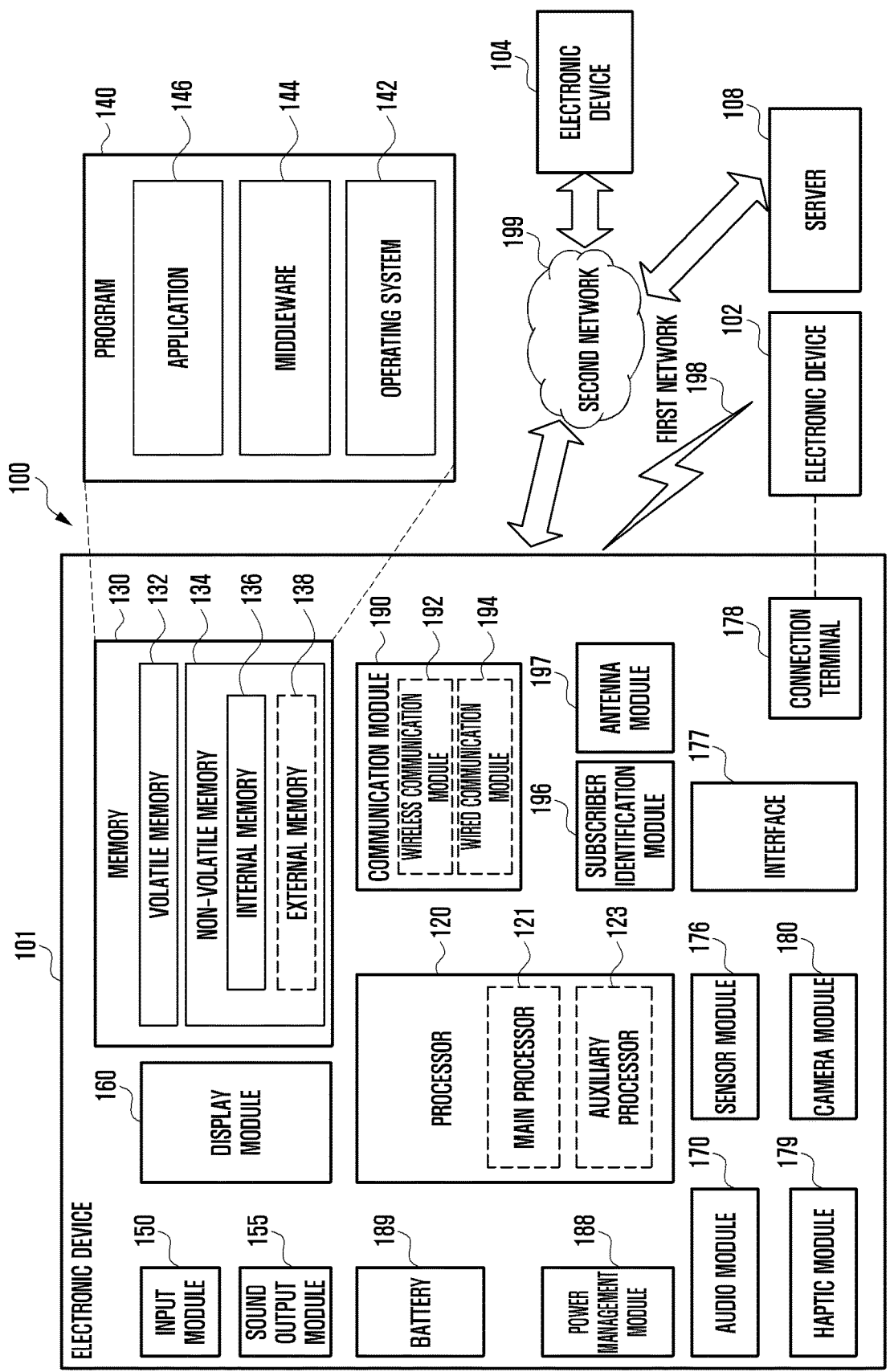
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
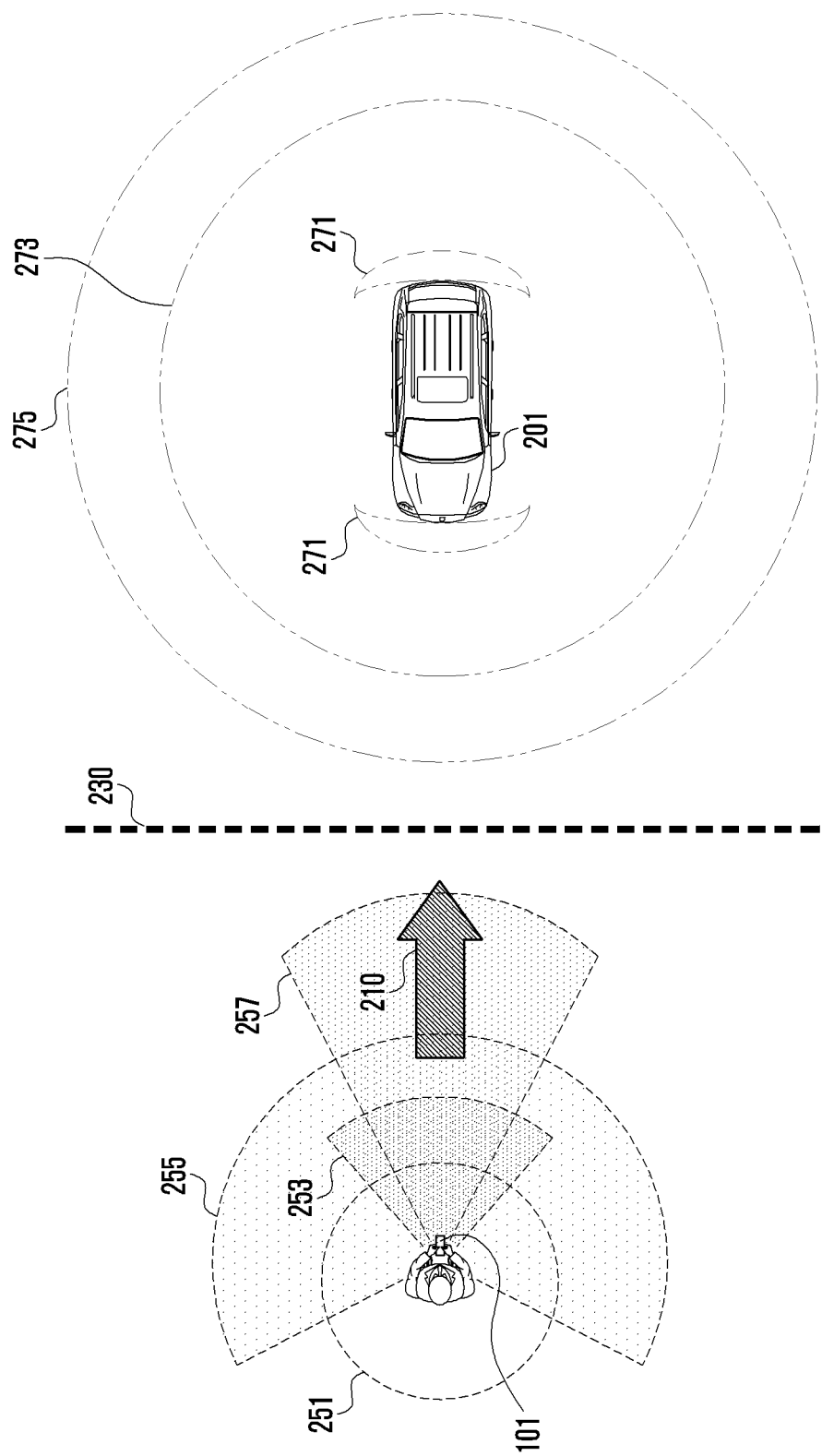
FIG. 2 is a diagram illustrating a network environment between an electronic device and a vehicle according to an embodiment of the disclosure.

FIG. 2 is a diagram illustrating a network environment between an electronic device and a vehicle according to an embodiment of the disclosure.

Referring to FIG. 2, when exceeding a predetermined distance 230 from the vehicle 201, the electronic device (e.g., the electronic device 101 of FIG. 1) according to various embodiments may support safe walking of a user while the user moves in the moving direction 210 by using at least one of a sensor module (e.g., the sensor module 176 of FIG. 1), a vision camera (e.g., the camera module 180 of FIG. 1), and a microphone (e.g., the input module 150 of FIG. 1). According to various embodiments, the electronic device 101 may include a smart phone, a tablet PC, and/or a laptop computer. The moving direction 210 may refer to a direction in which the vehicle 201 moves. Similar to the electronic device 101, the vehicle 201 may include a walking support device (or system) that supports the user's safe walking.

For example, the electronic device 101 may determine (or predict or calculate) an expected moving path to the vehicle 201 based on the location information of the vehicle 201 and the location information of the electronic device 101. The location information of the vehicle 201 may be stored in a memory (e.g., the memory 130 of FIG. 1) of the electronic device 101. For example, the user may turn off the vehicle 201 and move while carrying the electronic device 101. The electronic device 101 may store the location of the vehicle 201 at the time of getting off the vehicle 201 or getting into the vehicle 201. In addition, the memory 130 may store a previous moving path of the user while moving away from the vehicle 201. The previous moving path may be calculated based on location information of the electronic device 101 acquired in real time or periodically when the location based service is activated (or turned on) in the electronic device 101. The electronic device 101 may transmit the location information of the electronic device 101 to the vehicle 201 while moving away from the vehicle 201. The electronic device 101 may acquire the expected moving path based on at least one of location information of the vehicle 201 stored in the memory 130, the previous moving path, or the location information of the electronic device 101. The electronic device 101 may acquire (or receive) the location information of the electronic device 101 in real time from a location information system (or satellite) through a location recognition module. The location recognition module may be a global positioning system (GPS) module or a GNSS module (e.g., the communication module 190 of FIG. 1), or a module for recognizing the location by using a signal from a surrounding base station, Wi-Fi, or a beacon signal.

The electronic device 101 may recognize obstacles located on the expected moving path and determine whether there will be a collision with the obstacles. The obstacles may interfere with or hinder the user's safe walking. For example, the obstacles may refer to telephone poles, traffic lights, railroad tracks, signboards, other users, bicycles, motorcycles, cars, and the like. The electronic device 101 may acquire the current location of the electronic device 101 in real time and acquire map information within a configured distance (e.g., 1 m, 3 m, or 5 m) based on the current location. The map information may include high definition (HD) map information (or dynamic map). The HD map information refers to a three-dimensional (3D) stereoscopic map with centimeter (cm) level precision and may be used for autonomous driving. The HD map information may include various types of information (e.g., terrain information, spatial information, location information, 3D map information reflecting 3D space mapping information) related to an object on the road (e.g., terrain and feature) as 3D digital information. The object included in the HD map information may refer to a real object (e.g., terrain information, feature information, etc.) in the real world.

The electronic device 101 may recognize an obstacle (e.g., an immovable obstacle (e.g., terrain, feature)) based on the HD map information, and determine whether there will be a collision with the obstacle. Alternatively, the electronic device 101 may recognize an obstacle by using at least one of a lidar, an ultrasonic sensor, an acceleration sensor, and a geomagnetic sensor. The lidar is an abbreviation of light detection and ranging or laser imaging, detection and ranging, and may refer to a sensor that outputs a laser to a target (e.g., objects (e.g., terrains (rivers, mountains, seas), features (e.g., roads, buildings, signs) and measures the time and intensity required for the output laser to return, thereby detecting distance, direction, speed, temperature, material distribution, and concentration characteristics. The lidar may be included in the electronic device 101 or attached to the electronic device 101 in the form of an accessory. The ultrasonic sensor may output ultrasonic waves (or ultrasonic signals) and may be used for distance measurement through a time when the output ultrasonic waves are reflected and returned. The acceleration sensor may be a sensor that detects the speed of the electronic device 101. The geomagnetic sensor may be a sensor that detects a direction of the electronic device 101, for example, yaw, roll, or pitch.

According to various embodiments, the electronic device 101 may recognize an obstacle by using a vehicle to everything (V2X) communication module (e.g., the communication module 190 of FIG. 1). The V2X may be a communication technology that exchanges information with other vehicles and things with infrastructure built on the road through a wired network or a wireless network. The V2X may include all types of communication technologies applicable to vehicles on the road, such as vehicle to vehicle (V2V), vehicle to infra (e.g., parking lots, traffic lights) (V21), vehicle to pedestrian (V2P), or vehicle to nomadic devices (V2N). The electronic device 101 may collect various types of information from Internet of Things (IoT) devices located on the road through the communication module 190.

The electronic device 101 may recognize an obstacle by using a time of flight (TOF) sensor (or a camera), a vision camera, or a microphone. For example, the electronic device 101 may recognize an obstacle located within a first distance 251 by using the microphone, recognize an obstacle located within a second distance 253 by using the vision camera, recognize an obstacle located within a third distance 255 by using a short-range communication method, and may recognize an obstacle located within a fourth distance 257 by using the lidar. The first distance 251 may be shorter than the second distance 253, the second distance 253 may be shorter than the third distance 255, and the third distance 255 may be shorter than the fourth distance 257. Such an example is only for helping understanding of the disclosure, and the disclosure is not limited by the description.

The electronic device 101 may analyze the sound input from the microphone and recognize an obstacle located around. The electronic device 101 may identify an obstacle by analyzing images acquired from the vision camera. The vision camera is a camera equipped with a vision sensor and may read a target object (e.g., an obstacle) by recognizing or detecting the images acquired through the camera. The electronic device 101 may calculate the distance to the obstacle based on information acquired (or collected) from the sensor module 176, the camera module 180, and the communication module 190, or calculate the approaching speed of the obstacle. The electronic device 101 may determine whether there will be a collision with the recognized obstacle based on the distance or speed with the obstacle.

According to various embodiments, when a collision with an obstacle is expected, the electronic device 101 may provide obstacle guidance information or obstacle collision risk. The obstacle guidance information indicates what the obstacle is, and may include, for example, at least one of text (e.g., a railroad track, a traffic light, a bicycle), image, or video. The electronic device 101 may display obstacle guidance information or a notification of an obstacle collision risk on a display (e.g., the display module 160 of FIG. 1). Alternatively, the electronic device 101 may provide obstacle guidance information or the notification of the obstacle collision risk through vibration or sound. The electronic device 101 may determine whether a wearable device (e.g., an earphone or an AR glasses) is connected and provide obstacle guidance information or the notification of the obstacle collision risk through the wearable device.

The electronic device 101 may provide the notification of the obstacle collision risk in a different or differentiated manner according to a risk level (e.g., collision, danger, warning). For example, when the risk level is collision, the risk may be high, when the risk level is danger, the risk may be medium, and when the risk level is warning, the risk may be low. The electronic device 101 may provide the notification of the obstacle collision risk differently for each risk level. For example, when the risk level is high, the electronic device 101 may provide the notification of the obstacle collision risk with red color, strong-intensity vibration (or several times, quickly), and loud sound (quickly). When the risk level is medium, the electronic device 101 may provide the notification of the obstacle collision risk with orange color, medium-intensity vibration (or several times, slowly), and medium sound (slowly). When the risk level is low, the electronic device 101 may provide the notification of the obstacle collision risk with yellow color, low-intensity vibration, and low sound. The above examples are only for helping understanding of the disclosure, and the disclosure is not limited for the purpose of explanation.

When a user is using the electronic device 101 (e.g., standing or walking) or may not face the surroundings, the electronic device 101 may recognize the user's dangerous situation. When the electronic device 101 determines that the user may be exposed to the risk of an accident, the sensors of the surrounding devices operate, and when the danger is detected, the electronic device 101 may provide feedback of the risk to the user.

According to various embodiments, the electronic device 101 may use the sensor module 176 or the camera module 180 to determine the use state of the electronic device 101. When the user walks while looking at the electronic device 101, it may be dangerous, so the electronic device 101 may determine whether the user sees the electronic device 101. The electronic device 101 may determine the use status of the electronic device 101 based on sensor information acquired from the sensor module 176 such as an illumination sensor, a proximity sensor, motion a sensor, an acceleration sensor, and a gyro sensor, or images acquired from the camera module 180. When the user walks while looking at the electronic device 101, sensing values (e.g., speed and rotation value) may continue to change. Alternatively, because the front camera of the electronic device 101 faces the user and the scene of the rear camera of the electronic device 101 continues to change while moving, the acquired image may continuously change.

For example, when the posture of the electronic device corresponds to a configured posture (e.g., a posture when a user walks and uses the electronic device), when a touch input is detected, or when a specific application is executed, the electronic device 101 may determine that the user's gaze direction is facing the electronic device 101. The electronic device 101 may provide obstacle guidance information or the notification of the obstacle collision risk when the user's gaze direction is facing the electronic device 101.

The user may continuously move in the direction where the vehicle 201 is located while carrying the electronic device 101. When the electronic device 101 continuously moves in the moving direction 210 and enters within the predetermined distance 230 where the electronic device may be connected (or paired) with the vehicle 201, the electronic device may be wirelessly connected to the vehicle 201. For example, the electronic device 101 may be connected to the vehicle 201 through short-range wireless communication such as radio-frequency identification (RFID), Bluetooth™, Bluetooth™ Low Energy, Wi-Fi, Wi-Fi Direct, or ultra-wideband (UWB). The electronic device 101 may be connected to the vehicle 201 by transmitting subscriber information (e.g., international mobile subscriber identifier (IMSI)) stored in the subscriber identification module 196 of FIG. 1 to the vehicle 201. The electronic device 101 may include a user's (e.g., owner, family, acquaintance of the vehicle 201) electronic device, which is connected to the vehicle 201 at least once for example, capable of using the vehicle 201. When wirelessly connected to the vehicle 201, the electronic device 101 may turn on the power of the vehicle 201 or control the vehicle 201 to start, and transmit the expected moving path.

When connected to the electronic device 101, the vehicle 201 may receive location information of the electronic device 101 from the electronic device 101 to determine an expected moving path. The expected moving path may be determined based on the location information of the vehicle 201 and the location information of the electronic device 101. The vehicle 201 may acquire (or receive) the location information of the vehicle 201 in real time from a location information system (or satellite) through a location recognition module before the vehicle 201 is turned off. The location recognition module may be a GPS or a GNSS module (e.g., the communication module 360 of FIG. 3) or a module for recognizing a location by using a signal from a surrounding base station, Wi-Fi, or a beacon signal. The vehicle 201 may acquire and store location information of the electronic device 101 while the electronic device 101 is moving away from the vehicle 201, and may use the information when determining an expected moving path. Alternatively, the vehicle 201 may receive an expected moving path from the electronic device 101. The vehicle 201 may recognize obstacles on the expected moving path based on the advanced driver assistance system (ADAS). For example, the vehicle 201 may recognize nearby obstacles based on at least one of a communication module, a vision camera, and a sensor module.

For example, the vehicle 201 may recognize obstacles located in the front and rear of the vehicle 201 within a first distance 271 through an ultrasonic sensor. The vehicle 201 may recognize obstacles located within a second distance 273 through a camera (e.g., a front camera, a vision camera), a lidar, laser, or radar. Alternatively, the vehicle 201 may recognize obstacles located within a third distance 275 by communicating with a surrounding electronic device, a surrounding vehicle, and a surrounding infrastructure through short-range communication such as V2X or UWB. The first distance 271 may be shorter than the second distance 273, and the second distance 273 may be shorter than the third distance 275. The above examples are only for helping understanding of the disclosure, and are not intended to limit the disclosure by explanation.

According to various embodiments, the vehicle 201 may transmit the recognized obstacle information to the electronic device 101. The obstacle information may include obstacle location information or obstacle speed information. Alternatively, the vehicle 201 may calculate the distance between the electronic device 101 and the obstacle or the speed of the obstacle based on the current location of the electronic device 101 with respect to the recognized obstacle. In this case, the obstacle information may include the distance between the electronic device 101 and the obstacle or the speed of the obstacle. The vehicle 201 may determine what the obstacle is based on HD map information or an acquired image, and may further include the obstacle type (e.g., person, animal, or object) in the obstacle information and transmit the same.

According to various embodiments, the vehicle 201 may receive location information (e.g., current location) of the electronic device 101 from the electronic device 101 in real time, periodically, or selectively. The vehicle 201 may receive obstacle information recognized by the electronic device 101 from the electronic device 101. At least one of obstacle location information, obstacle speed information, obstacle type information, or distance information between the obstacle and the electronic device 101 may be received as the obstacle information. The vehicle 201 may determine whether there will be a collision with the obstacle based on at least one of obstacle information recognized by the vehicle 201, obstacle information received from the electronic device 101, or the location information of the electronic device 101.

When a collision between a user and an obstacle is expected, the vehicle 201 may provide a notification of obstacle collision risk through an output module. For example, the output module may include at least one light source (e.g., light sources associated with different directions) to output light or a horn of the vehicle 201 to output a sound. The vehicle 201 may provide the notification of the obstacle collision risk by turning on one or more of the at least one light source or outputting sound from the horn. For example, the vehicle 201 may turn on a light source associated with a direction among a plurality of light sources respectively corresponding to different directions based on the location of the obstacle or the location information of the electronic device 101. The vehicle 201 may turn on a left light source when the obstacle is located on a left side of the vehicle 201, and may turn on a right light source when the obstacle is located on a right side of the vehicle 201. Alternatively, the vehicle 201 may turn on the left light source when the electronic device 101 is located on the left side of the vehicle 201, and turn on the right light source when the electronic device 101 is located on the right side of the vehicle 201. The vehicle 201 may at least one of turn on a light source associated with a direction among a plurality of light sources respectively corresponding to different directions, or output sound at a sound level from the horn, based on the location of the obstacle or the location information of the electronic device 101.

According to various embodiments, the vehicle 201 may at least one of turn on a light source associated with a direction among a plurality of light sources respectively corresponding to different directions, set an intensity of light output from a light source, or output sound at a sound level from the horn, according to the risk level. For example, when the risk level is collision, the vehicle 201 may determine that the risk is high and at least one of output a high-intensity of light from a light source or output sound at a high level from the horn. When the risk is high, the vehicle 201 may differently turn on a light source associated with a direction among a plurality of light sources respectively corresponding to different directions. When the risk level is danger, the vehicle 201 may determine that the risk is an intermediate level and at least one of output an intermediate intensity of light from a light source or output sound at an intermediate level from the horn. When the risk level is medium, the vehicle 201 may turn on only one light source associated with one direction among a plurality of light sources respectively corresponding to different directions. When the risk level is warning, the vehicle 201 may determine that the risk level is low and at least one of output a low-intensity of light from a light source or output sound at a low sound level from horn. Alternatively, when the light sources of the vehicle 201 may output different colors, the vehicle 201 may use one or more of the light sources to output different colors of light according to the risk level. The above examples are only for helping understanding of the disclosure, and the disclosure is not limited for the purpose of explanation.

Figure 3:
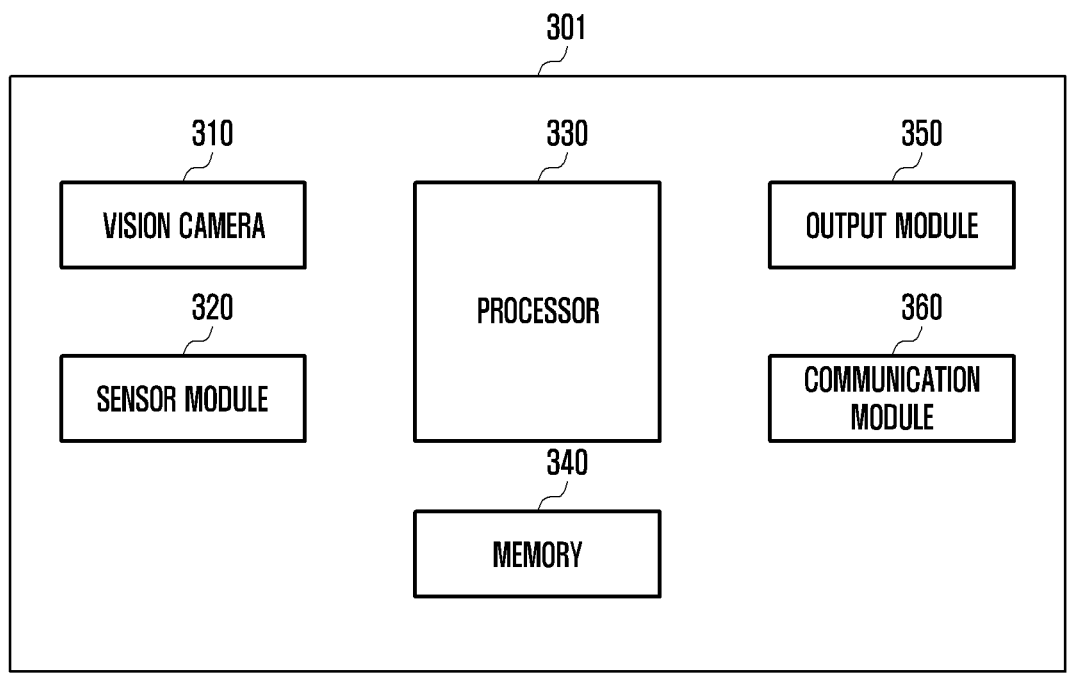
FIG. 3 is a configuration diagram illustrating an internal configuration of an electronic device according to an embodiment of the disclosure.

FIG. 3 is a configuration diagram illustrating an internal configuration of an electronic device according to an embodiment of the disclosure.

Referring to FIG. 3, a vehicle (e.g., the vehicle 201 of FIG. 2) according to various embodiments may include (or be mounted on) a walking support device (or system) 301 (or the electronic device 101 of FIG. 1). The walking support device 301 may include a vision camera 310, a sensor module 320, a processor 330, a memory 340, an output module 350, and a communication module 360. The walking support device 301 may be similar to the electronic device 101 of FIG. 1 and may further include other components not illustrated in FIG. 3 (e.g., the display module 160).

The vision camera 310 or the sensor module 320 may be disposed inside or outside the vehicle 201. The vision camera 310 may be installed in front, rear, or side of the vehicle 201 to photograph the outside of the vehicle 201 within a configured distance (e.g., 10 m) according to the angle of view or resolution. The vision camera 310 may be a camera including a vision sensor. The sensor module 320 is the same or similar to the sensor module 176 of FIG. 1, and may include at least one of an ultrasonic sensor, a lidar, a radar, a laser, an acceleration sensor, or a geomagnetic sensor. The lidar, radar, or laser may refer to a sensor that detects distance, direction, speed, temperature, material distribution, and concentration characteristics by outputting laser (or radio waves) to a target (e.g., objects (e.g., terrains (rivers, mountains, seas), features (e.g., roads, buildings, signs) and measuring the time and intensity taken for the output laser to return. The acceleration sensor may be a sensor that detects a speed of the vehicle 201. The geomagnetic sensor may be a sensor that detects the direction (or steering angle) of the vehicle 201, for example, yaw, roll, and pitch.

The output module 350 may include at least one of one or more light sources or one or more horns of the vehicle 201. The output module 350 may control at least one of one or more light sources or one or more horns of the vehicle 201 according to the control of the processor 330. The light sources of the vehicle 201 may include a first light source disposed on the right side of the vehicle 201 or a second light source disposed on the left side of the vehicle 201.

The communication module 360 may acquire (or receive) location information or map information of the walking support device 301 from an external server (e.g., a location providing system or a navigation system). The map information may be HD map information. The communication module 360 may communicate with at least one of an electronic device (e.g., the electronic device 101 of FIG. 1), a surrounding electronic device, a surrounding vehicle, or a surrounding infrastructure through short-range communication such as V2X and UWB. The electronic device 101 may include a user (e.g., owner, family, acquaintance of the vehicle 201)'s electronic device, which is connected to the vehicle 201 at least once for example, capable of using the vehicle 201. The communication module 360 may receive the current location or expected moving path of the electronic device 101 from the electronic device 101. The communication module 360 may collect information from at least one of the surrounding electronic device, the surrounding vehicle, or the surrounding infrastructure. The communication module 360 may transmit at least one of the location information of the walking support device 301, map information, the current location of the electronic device 101, the expected moving path, or collected information to the processor 330.

The processor 330 may perform the same or similar role as the processor 120 of FIG. 1. For example, the processor 330 may acquire an image captured by the vision camera 310 or a sensor value measured by the sensor module 320.

The processor 330 may recognize an obstacle (or target object) by analyzing the image. For example, the processor 330 may recognize whether the obstacle is a person, an animal, or an object. The processor 330 may acquire location information (e.g., current location of the vehicle 201) of the vehicle 201, speed information of the vehicle 201, steering angle information of the vehicle 201, or distance information between the vehicle 201 and an obstacle by using the sensor value. The processor 330 may acquire at least one of location information, map information, current location of the electronic device 101, an expected moving path, or collected information from the communication module 360. The processor 120 may store the acquired information in the memory 340.

The processor 330 may analyze the acquired information to recognize an obstacle and determine whether a collision with the obstacle occurs. The processor 330 may determine whether a collision with the obstacle occurs based on the location information of the recognized obstacle and the electronic device 101. When a collision between a user and an obstacle is expected, the processor 330 may control to provide a notification of an obstacle collision risk through the output module 350. For example, the processor 330 may control to provide the notification of the obstacle collision risk by at least one of turning on one or more light sources of the vehicle 201 or outputting sound from one or more horns. The processor 330 may control to at least one of turn on a light source associated with a direction among a plurality of light sources respectively corresponding to different directions, set an intensity of light from a light source, or output sound at a sound level from the horn, according to the risk level. For example, the processor 330 may drive either a first light source disposed on the right side of the vehicle or a second light source disposed on the left side of the vehicle, change a pattern for driving at least one of the first light source or the second light source, or drive the first light source, the second light source, and the horn. The pattern for driving the first light source and the second light source may refer to a pattern of blinking lights.

For example, when the risk level is collision, the processor 330 may determine that the risk is high and control to at least one of output a high-intensity of light from a light source or output sound at a high level from the horn. When the risk is high, the processor 330 may control to output the direction or the blinking pattern of light from one or more light sources differently. When the risk level is danger, the processor 330 may determine that the risk is an intermediate level and control to at least one of output an intermediate-intensity of light from a light source or output sound at an intermediate level from the horn. When the risk level is medium, the processor 330 may control to output light from a light source corresponding to one direction. When the risk level is warning, the processor 330 may determine that the risk level is low and control to at least one of output a low-intensity of light from a light source or output sound at a low level form the horn. Alternatively, when the light sources of the vehicle 201 may output different colors, the processor 330 may control one or more of the light sources to output different colors of light according to the risk level.

An electronic device (e.g., the walking support device 301 of FIG. 3) according to various embodiments of the disclosure may include a vision camera (e.g., the vision camera 310 of FIG. 3), a sensor module (e.g., the sensor module 320 of FIG. 3), a communication module (e.g., the communication module 360 of FIG. 3), an output module (e.g., the output module 350 of FIG. 3), a memory (e.g., the memory 340 of FIG. 3), and a processor (e.g., the processor 330 of FIG. 3) operatively connected to the vision camera, the sensor module, the communication module, the output module, and the memory, wherein the processor may be configured to connect to an external electronic device through the communication module, receive location information of the external electronic device and determine an expected moving path, recognize an obstacle on the expected moving path based on at least one of the location information of the external electronic device, an image acquired from the vision camera, a sensor value acquired from the sensor module, or information collected from another device located on a road through the communication module, and determine risk of collision between the external electronic device and the obstacle and provide a risk notification through the output module.

The electronic device may be configured to be mounted on a vehicle (e.g., the vehicle 201 of FIG. 2) and at least one of turn on power of the vehicle, turn on an ignition of the vehicle, or turn on an engine of the vehicle, according to the control of the external electronic device.

The output module may be configured to include a horn, a first light source disposed on first side (e.g., right side) of the vehicle, or a second light source disposed on a second side (e.g., left side) of the vehicle, and the processor may be further configured to at least one of drive the first light source or the second light source differently or output sound from the horn, based on at least one of the location information of the external electronic device or a location of the obstacle.

The processor may be further configured to at least one of turn on one of a plurality of light sources that each correspond to a different direction, set an intensity of at least one of the plurality of light sources, or output sound at a sound level from a horn, differently according to the risk level for the risk notification.

The processor may be further configured to recognize an obstacle located within a first distance from the electronic device through an ultrasonic sensor, recognize an obstacle located within a second distance from the electronic device through the vision camera or a lidar, and recognize an obstacle located within a third distance from the electronic device through vehicle to everything (V2X) or ultra-wideband (UWB) communication, and wherein first distance may be shorter than the second distance, and the second distance may be shorter than the third distance.

The processor may be further configured to calculate distance between the electronic device and the recognized obstacle or a speed of the obstacle based on a current location of the external electronic device, determine whether there will be a collision with an obstacle based on at least one of the distance between the electronic device and the obstacle or the speed of the obstacle, and provide a risk notification based on a result of the determination.

The processor may be further configured to transmit obstacle information including the recognized obstacle to the external electronic device, receive obstacle information recognized by the external electronic device from the external electronic device, and determine the risk of collision between the external electronic device and the obstacle based on the recognized obstacle and the received obstacle information.

The processor may be further configured to acquire high definition (HD) map information from a server, and determine the risk of collision between the external electronic device and the obstacle further based on the acquired map information.

An electronic device (e.g., the electronic device 101 of FIG. 1) according to various embodiments of the disclosure may include a sensor module (e.g., the sensor module 176 of FIG. 1), a vision camera (e.g., the camera module 180 of FIG. 1), a communication module (e.g., the communication module 190 of FIG. 1), a location recognition module, a memory (e.g., the memory 130 of FIG. 1), and a processor (e.g., the processor 120 of FIG. 1) operatively connected to the sensor module, the vision camera, the communication module, the location recognition module, or the memory, wherein the processor may be configured to acquire location information of the electronic device by using the location recognition module, identify an expected moving path based on location information of a vehicle stored in the memory and the acquired location information, recognize an obstacle on the expected moving path based on at least one of the location information of the external electronic device, an image acquired from the vision camera, or a sensor value acquired from the sensor module, provide a risk notification based on the recognized obstacle, connect to the vehicle in case of entering within a predetermined distance from the vehicle according to movement of the electronic device, and provide a risk notification through the vehicle.

The memory may be configured to further store a previous moving path acquired based on a location change of the electronic device while moving away from the vehicle, and the processor may be further configured to determine the expected moving path further based on the previous moving path.

The processor may be further configured to provide the risk notification through at least one of a display module, a haptic module, or a speaker in case of not being connected to the vehicle, and provide the risk notification through the electronic device or the vehicle in case of being connected to the vehicle.

The processor may be further configured to recognize an obstacle located within a first distance from the electronic device by using a microphone of the electronic device, recognize an obstacle located within a second distance from the electronic device through the vision camera, recognize an obstacle located within a third distance from the electronic device by using vehicle to everything (V2X) or ultra-wideband (UWB) communication, and recognize an obstacle located within a fourth distance from the electronic device by using a lidar, and the first distance may be shorter than the second distance, the second distance may be shorter than the third distance, and the third distance may be shorter than the fourth distance.

The processor may be further configured to receive obstacle information from the vehicle in case of being connected to the vehicle, determine whether there will be a collision between the electronic device and an obstacle based on at least one of the recognized obstacle, or the received obstacle information, and provide the risk notification based on a result of the determination.

The processor may be further configured to acquire high definition (HD) map information from a server, and determine whether there will be a collision between the electronic device and an obstacle further based on the acquired map information.

The processor may be further configured to track a user's gaze direction, provide the risk notification through at least one of a display module, a haptic module, or a speaker in case of the user's gaze direction is facing the electronic device, and provide the risk notification through the vehicle in case of the user's gaze direction is not facing the electronic device.

The processor may be further configured to determine that the user's gaze direction is facing the electronic device when the posture of the electronic device corresponds to at least one of a configured posture, a touch input is detected, or a specific application is executed.

The processor may be further configured to determine whether connected to the wearable device, and to provide a risk notification through the wearable device when connected to the wearable device.

The processor may be further configured to differently provide a risk notification based on the risk level or the type of obstacle.

Figure 4:
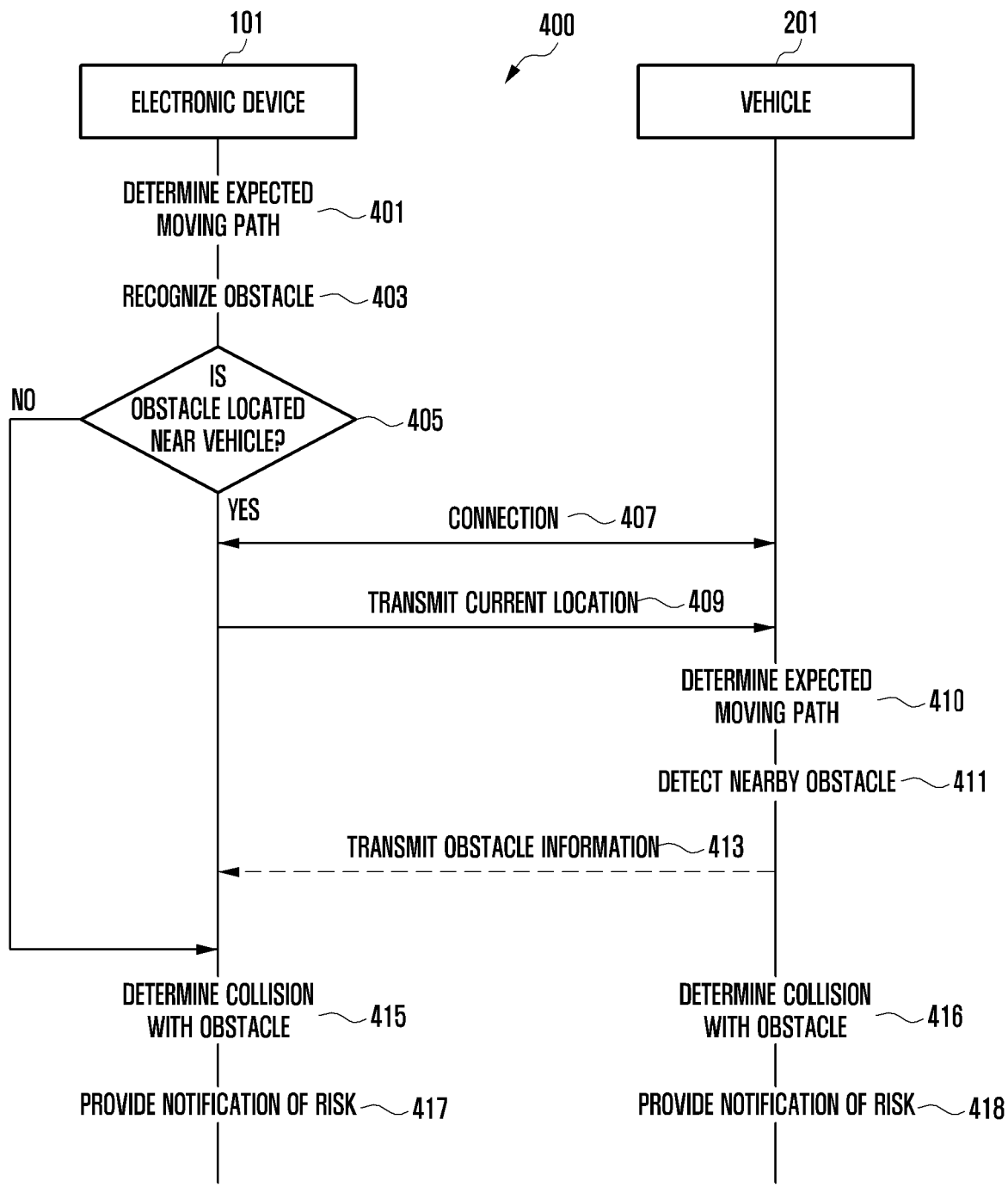
FIG. 4 is a flowchart illustrating a method of providing user feedback for safe walking through information exchange between an electronic device and a vehicle according to an embodiment of the disclosure.

FIG. 4 is a flowchart 400 illustrating a method of providing user feedback for safe walking through information exchange between an electronic device and a vehicle according to an embodiment of the disclosure.

Referring to FIG. 4, in operation 401, the electronic device (e.g., the electronic device 101 of FIG. 1) according to various embodiments may determine an expected moving path of a user. The expected moving path may refer to a path in which a user with the electronic device 101 moves in the direction of the vehicle (e.g., the vehicle 201 of FIG. 2) or moves away (or escapes) from the vehicle 201. The electronic device 101 may calculate the expected moving path based on the location information of the vehicle 201 stored in a memory (e.g., the memory 130 of FIG. 1) and the current location of the electronic device 101. Alternatively, the electronic device 101 may calculate the expected moving path by further considering the previous moving path. The previous moving path may be calculated based on a change in the location of the electronic device 101 over time while the electronic device 101 stores the location information of the vehicle 201 and then moves away from the vehicle 201.

In operation 403, the electronic device 101 may recognize obstacles located on the expected moving path. The obstacles may interfere with or hinder the user's safe walking. For example, the obstacles may refer to telephone poles, traffic lights, railroad tracks, signboards, other users, bicycles, motorcycles, cars, and the like. The electronic device 101 may acquire the current location of the electronic device 101 in real time and acquire map information within a configured distance (e.g., 1 m, 3 m, or 5 m) based on the current location. The map information may include HD map information. The electronic device 101 may acquire a sensor value (or sensor data) from at least one of a lidar, an acceleration sensor, or a geomagnetic sensor. The electronic devices 101 may acquire images from a TOF sensor (or camera), a vision camera (e.g., the camera module 180 of FIG. 1) or sound from a microphone (e.g., the input modules 150 of FIG. 1). The electronic device 101 may recognize obstacles based on at least one of the sensor value, the image, the sound, or the map information. According to various embodiments, the electronic device 101 may recognize obstacles by using short-range communication such as V2X and UWB. The electronic device 101 may collect various types of information from an IoT device located on a road through the communication module 190.

In operation 405, the electronic device 101 may determine whether the electronic device is located close to the vehicle 201. When located close to the vehicle 201 (e.g., within a predetermined distance (e.g., within the predetermined distance 230 of FIG. 2)), the electronic device 101 may wirelessly connect the vehicle 201 and the vehicle 201. When the electronic device 101 is not located close to the vehicle 201, the electronic device 101 may not be connected to the vehicle 201. The electronic device 101 may perform operation 407 when the electronic device is located close to the vehicle 201, and may perform operation 415 when the electronic device is not located close to the vehicle 201.

When located close to the vehicle 201, in operation 407, the electronic device 101 may be connected to the vehicle 201. For example, the electronic device 101 may be connected to the vehicle 201 through short-range wireless communication such as Bluetooth™, Bluetooth™ Low Energy, Wi-Fi, Wi-Fi Direct, or UWB. The electronic device 101 may include a user (e.g., owner, family, acquaintance of the vehicle 201)'s electronic device, which is connected to the vehicle 201 at least once for example, capable of using the vehicle 201. The electronic device 101 may be connected to the vehicle 201 by transmitting subscriber information (e.g., international mobile subscriber identifier (IMSI)) stored in the subscriber identification module 196 of FIG. 1 to the vehicle 201. When wirelessly connected to the vehicle 201, the electronic device 101 may turn on the power of the vehicle 201 or control the vehicle 201 to start.

In operation 409, the electronic device 101 may transmit the current location of the electronic device 101 to the vehicle 201. The electronic device 101 may transmit the current location of the electronic device 101 in real time, periodically, or selectively. Alternatively, the electronic device 101 may transmit the expected moving path to the vehicle 201 together with the current location of the electronic device 101. The electronic device 101 may acquire the current location (or location information) of the electronic device 101 through a location recognition module. The location recognition module may be a GPS module or a GNSS module (e.g., the communication module 190 of FIG. 1) or a module for recognizing a location by using a signal from a surrounding base station, Wi-Fi, or a beacon signal.

In operation 410, the vehicle 201 may determine an expected moving path based on the current location of the electronic device 101 and the current location of the vehicle 201. The vehicle 201 may include the walking support device 301 of FIG. 3. The vehicle 201 may directly determine the expected moving path or receive the expected moving path from the electronic device 101. When the vehicle 201 receives the expected moving path from the electronic device 101, operation 410 may be omitted. This is only an implementation issue, and the disclosure is not limited by the description.

In operation 411, the vehicle 201 may detect (or recognize) nearby obstacles based on ADAS. The vehicle 201 may recognize nearby obstacles based on at least one of the current location of the electronic device 101, the expected moving path, the sensor value (e.g., acquired from sensor module 320), the image (e.g., acquired from the sensor module 320), or the collected information (e.g., acquired from the communication module 360 of FIG. 3). For example, the vehicle 201 may recognize obstacles located in the front and rear of the vehicle 201 within a first distance (e.g., the first distance 271 of FIG. 2) through an ultrasonic sensor (e.g., the sensor module 320 of FIG. 3). The vehicle 201 may recognize obstacles located within the second distance (e.g., the second distance 273 of FIG. 2) through a front camera, a vision camera (e.g., the vision camera 310 of FIG. 3), a lidar, laser, and radar. The vehicle 201 may recognize obstacles located within the third distance (e.g., the third distance of FIG. 2) by communicating with surrounding electronic devices, surrounding vehicles, and surrounding infrastructure through short-range communication such as V2X and UWB (e.g., the third distance 275 of FIG. 2).

In operation 413, the vehicle 201 may transmit the recognized obstacle information to the electronic device 101. The obstacle information may include obstacle location information or obstacle speed information. Alternatively, the vehicle 201 may calculate the distance between the electronic device 101 and the obstacle or the speed of the obstacle based on the current location of the electronic device 101 with respect to the recognized obstacle. In this case, the obstacle information may include the distance between the electronic device 101 and the obstacle or the speed of the obstacle. The vehicle 201 may determine what the obstacle is based on HD map information or an acquired image, and may further include the obstacle type (e.g., person, animal, or object) in the obstacle information and transmit the same. Alternatively, according to implementation, the vehicle 201 may not transmit the recognized obstacle information to the electronic device 101. When the vehicle 201 does not transmit the recognized obstacle information to the electronic device 101, operation 413 may be omitted. This is only an implementation issue, and the disclosure is not limited by description.

In operation 415, the electronic device 101 may determine a collision with the obstacle occurs. When not located close to the vehicle 201, the electronic device 101 may determine whether there is an obstacle collision without connection with the vehicle 201. The electronic device 101 may determine whether there will be a collision with the obstacle by calculating the distance to the obstacle until connected to the vehicle 201, or by calculating the approaching speed of the obstacle. When connected to the vehicle 201, the electronic device 101 may further consider the obstacle information received from the vehicle 201 to determine whether there will be a collision with the obstacle. The electronic device 101 may calculate the distance between the obstacle recognized by the electronic device 101 or the obstacle recognized by the vehicle 201 and the electronic device 101, or calculate the approaching speed of the obstacle. The electronic device 101 may determine whether there will be a collision with the recognized obstacle based on the distance or speed of the obstacle.

In operation 417, the electronic device 101 may notify of risk based on the collision with the obstacle. For example, the obstacle guidance information indicates what the obstacle is, and for example, may include at least one of text (e.g., a railroad track, a traffic light, a bicycle), image, or video. The electronic device 101 may display obstacle guidance information or a notification of an obstacle collision risk on a display (e.g., the display module 160 of FIG. 1). Alternatively, the electronic device 101 may provide obstacle guidance information or the notification of the obstacle collision risk through vibration or sound. The electronic device 101 may control the haptic module 179 of FIG. 1 to provide obstacle guidance information or vibration for obstacle collision risk, or output the obstacle guidance information or sound (e.g., warning sound, voice) for the notification of the obstacle collision risk through the sound output module 155. The electronic device 101 may determine whether a wearable device (e.g., an earphone or an AR glasses) is connected and provide the obstacle guidance information or the notification of the obstacle collision risk through the wearable device.

According to various embodiments, the electronic device 101 may use the sensor module 176 or the camera module 180 to determine the use state of the electronic device 101. When the user walks while looking at the electronic device 101, it may be dangerous, so the electronic device 101 may determine whether the user sees the electronic device 101. When the posture of the electronic device 101 corresponds to a configured posture (e.g., a posture when a user walks and uses the electronic device), when a touch input is detected, or when a specific application is executed, the electronic device 101 may determine that the user's gaze direction is facing the electronic device 101. The electronic device 101 may provide obstacle guidance information or the notification of the obstacle collision risk when the user's gaze direction is facing the electronic device 101.

In operation 416, the vehicle 201 may determine whether a collision with the obstacle occurs. The vehicle 201 may determine whether the collision with the obstacle occurs based on the location information of the recognized obstacle and the electronic device 101. The vehicle 201 may receive obstacle information recognized by the electronic device 101 or location information of the electronic device 101 from the electronic device 101. At least one of obstacle location information, obstacle speed information, obstacle type information, or distance information between the obstacle and the electronic device 101 may be received as the obstacle information. The vehicle 201 may determine whether there will be a collision with the obstacle based on at least one of obstacle information recognized by the vehicle 201, obstacle information received from the electronic device 101, or the location information of the electronic device 101.

In operation 418, the vehicle 201 may notify of risk based on the collision with the obstacle. When a collision between a user and an obstacle is expected, the vehicle 201 may provide a notification of an obstacle collision risk through an output module. For example, the output module may include at least one of one or more light sources or one or more horns of the vehicle 201. The vehicle 201 may provide the notification of the obstacle collision risk by turning on a light source or outputting sound from a horn. The vehicle 201 may at least one of turn on a light source associated with a direction among a plurality of light sources respectively corresponding to different direction, set an intensity of light from a light source, or output sound at a sound level from the horn according to the risk level.

According to various embodiments, when the electronic device 101 and the vehicle 201 are not connected, only operations 415 and 417 may be performed, and when the electronic device 101 and the vehicle 201 are connected, operations 415 and 417 may be performed simultaneously or sequentially with operations 416 and 418, or performed only by one entity. For example, when the electronic device 101 and the vehicle 201 are connected and the user's gaze direction is facing the electronic device 101, operations 415 and 417 may be performed, and when the user's gaze direction is not facing the electronic device 101, operations 416 and 418 may be performed. Alternatively, regardless of the user's gaze direction, operations 415 and 417 may be performed simultaneously or sequentially with operations 416 and 418. This is merely an implementation issue, and the disclosure is not limited by the description.

Figure 5:
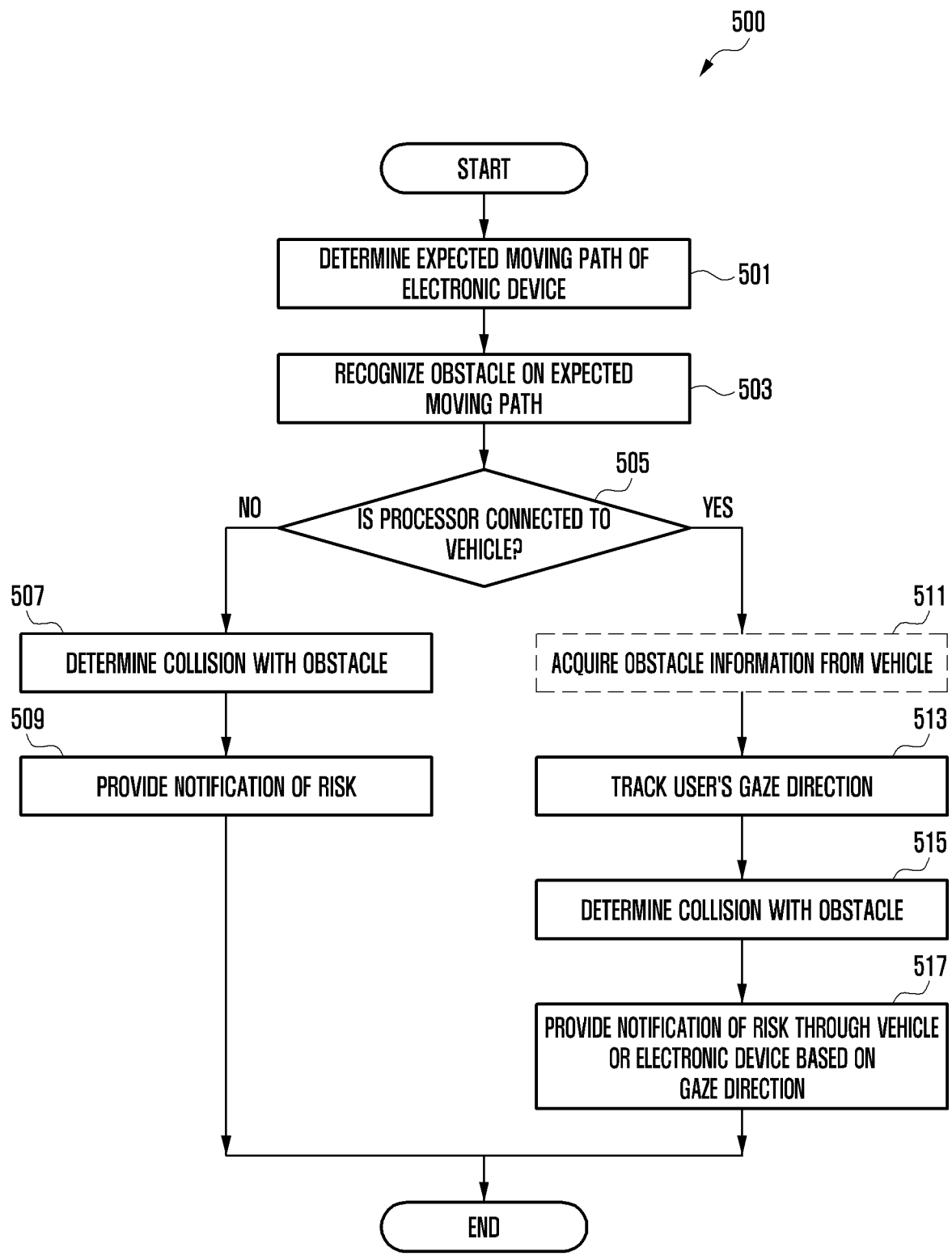
FIG. 5 is a flowchart illustrating an operating method of an electronic device according to an embodiment of the disclosure.

FIG. 5 is a flowchart 500 illustrating an operating method of an electronic device according to an embodiment of the disclosure.

Referring to FIG. 5, in operation 501, a processor (e.g., the processor 120 of FIG. 1) of the electronic device (e.g., the electronic device 101 of FIG. 1) according to various embodiments may acquire an expected moving path. The expected moving path may refer to a path in which a user with the electronic device 101 moves in the direction of the vehicle (e.g., the vehicle 201 of FIG. 2) or moves away from the vehicle 201. The user may turn off the vehicle 201 and move while carrying the electronic device 101. The processor 120 may store the location information of the vehicle 201 in a memory (e.g., the memory 130 of FIG. 1) at the time of getting off the vehicle 201 or getting into the vehicle 201. The processor 120 may calculate the expected moving path based on the location information of the vehicle 201 stored in the memory 130 and the current location of the electronic device 101. The processor 120 may acquire the current location of the electronic device 101 through the location recognition module. The location recognition module may be a GPS module or a GNSS module (e.g., the communication module 190 of FIG. 1), or a module for recognizing the location by using a signal from a surrounding base station, Wi-Fi, or a beacon signal. In addition, after storing the location information of the vehicle 201, the processor 120 may calculate a previous path based on a location change of the electronic device 101 over time while moving away from the vehicle 201. The processor 120 may store the previous path along with the location information of the vehicle 201 in the memory 130. The processor 120 may calculate the expected moving path by further considering the previous moving path.

In operation 503, the processor 120 may recognize obstacles located on the expected moving path. The obstacles may interfere with or hinder the user's safe walking. For example, the obstacles may refer to telephone poles, traffic lights, railroad tracks, signboards, other users, bicycles, motorcycles, cars, and the like. The processor 120 may acquire the current location of the electronic device 101 in real time and acquire map information within a configured distance (e.g., 1 m, 3 m, or 5 m) based on the current location from a map information providing server (e.g., the server 108 of FIG. 1). The map information may include HD map information. The HD map information refers to a 3D stereoscopic map with centimeter (cm) level precision and may be used for autonomous driving. The object included in the HD map information may refer to a real object (e.g., terrain information, feature information, etc.) in the real world. The processor 120 may recognize an obstacle (e.g., an immovable obstacle (e.g., terrain, feature)) based on the HD map information. The processor 120 may recognize an obstacle based on a sensor value acquired through a sensor module (e.g., the sensor module 176 of FIG. 1). The sensor module 176 may include at least one of a lidar, an acceleration sensor, and a geomagnetic sensor. The lidar may be included in the electronic device 101 or attached to the electronic device 101 in the form of an accessory.

The processor 120 may recognize an obstacle by using V2X or UWB communication. The V2X may be a communication technology that exchanges information with other vehicles and things with infrastructure built on the road through a wired network or a wireless network. Alternatively, the processor 120 may recognize an obstacle by using a TOF sensor (or camera), a vision camera, or a microphone. For example, processor 120 may analyze the sound input from the microphone and recognize an obstacle located around. The processor 120 may identify an obstacle by analyzing images acquired from the vision camera. The processor 120 may transmit sound or images to artificial intelligence (AI) or an external server (e.g., the server 108 of FIG. 1) for sound analysis or image analysis, and acquire an analyzed result. The processor 120 may calculate the distance to the obstacle calculate the approaching speed of the obstacle based on at least one of map information, the sensor value, the image, or sound.

In operation 505, the processor 120 may determine whether the vehicle 201 is connected. When the processor 120 is close to the vehicle 201 (e.g., within a predetermined distance (e.g., within the predetermined distance 230 of FIG.

2), the processor may be wirelessly connected to the vehicle 201. The processor 120 may be connected to the vehicle 201 by transmitting subscriber information (e.g., international mobile subscriber identifier (IMSI)) stored in the subscriber identification module 196 of FIG. 1 to the vehicle 201. The connection with the vehicle 201 may be performed before or after operation 501 or operation 503. The processor 120 may perform operation 507 when not connected to the vehicle 201 and perform operation 511 when connected to the vehicle 201.

When not connected to the vehicle 201, in operation 507, the processor 120 may determine whether an obstacle collides. For example, the processor 120 may calculate the user's speed by using the location information received from the location providing server and the sensor value acquired from the sensor module 176. Because the user has the electronic device 101, the user's speed may be interpreted as the speed of the electronic device 101. The processor 120 may determine whether the electronic device 101 collides with the obstacle based on at least one of the distance between the recognized obstacle and the electronic device 101, the speed of the electronic device 101, and the current location of the electronic device 101.

In operation 509, the processor 120 may provide a risk notification based on the determination result. When not located close to the vehicle 201, the processor 120 may determine whether there is an obstacle collision without connection with the vehicle 201 and provide a risk notification. For example, the processor 120 may calculate a speed at which an obstacle approaches the electronic device 101 based on at least one of the distance between the recognized obstacle and the electronic device 101, the speed of the recognized obstacle, or the speed of the electronic device 101. The processor 120 may display the distance to the obstacle or the speed of the obstacle through a display (e.g., the display module 160 of FIG. 1). The processor 120 may identify the obstacle based on the vision camera, collected information, or sensor values, and provide obstacle guidance information based on the identified obstacle. The obstacle guidance information indicates what the obstacle is, and may refer to, for example, a person, an animal, means of transportation, an object, a building, or a pillar. The obstacle guidance information may include at least one of text, image (e.g., an icon image of an obstacle), or video. Alternatively, the processor 120 may provide obstacle guidance information or a notification of obstacle collision risk through vibration or sound.

According to various embodiments, the processor 120 may display a risk notification differently depending on the type of obstacle. For example, the processor 120 may mark separately whether the obstacle is a movable object (e.g., people, cars, motorcycles, bicycles) (e.g., dynamic marking) or an immovable object (e.g., telephone poles, railroad tracks, traffic lights) (e.g., fixed marking). The processor 120 may provide at least one of the height (e.g., stairs, potholes, bumps) of the obstacle, the warning mark (e.g., driveways, railroad tracks, traffic lights) for a situation, the expected time of collision with the obstacle (e.g., countdown), the color change according to the risk level (e.g., collision, danger, warning), the size of the obstacle, or the weight of the obstacle as a risk notification. For example, when the risk level is collision, the risk may be high, when the risk level is danger, the risk may be medium, and when the risk level is warning, the risk may be low. The processor 120 may provide the notification of the obstacle collision risk differently for each risk level. For example, when the risk level is high, the processor 120 may provide the notification of the obstacle collision risk with red color, strong-intensity vibration, and loud sound. When the risk level is medium, the processor 120 may provide the notification of the obstacle collision risk with orange color, medium-intensity vibration, and medium sound. When the risk level is low, the processor 120 may provide the notification of the obstacle collision risk with yellow color, low-intensity vibration, and low sound.

According to various embodiments, the processor 120 may determine whether a wearable device (e.g., an earphone, a watch) is connected to the electronic device 101 and provide obstacle guidance information or a notification of an obstacle collision risk through the wearable device. For example, when the earphone and the watch are connected, the processor 120 may output sound through the earphone and provide visual display and vibration through the watch. The processor 120 may control the wearable device to transmit a risk notification command to the wearable device.

According to various embodiments, the processor 120 may use the sensor module 176 or the camera module 180 to determine the use state of the electronic device 101. The processor 120 may determine the use status of the electronic device 101 based on sensor information acquired from the sensor module 176, or images acquired from the camera module 180. When the user walks while looking at the electronic device 101, sensing values (e.g., speed and rotation value) may continue to change. Alternatively, because the front camera of the electronic device 101 faces the user and the scene of the rear camera of the electronic device 101 continues to change while moving, the acquired image may continuously change. When the posture of the electronic device 101 corresponds to a configured posture, when a touch input is detected, or when a specific application is executed, the processor 120 may determine that the user's gaze direction is facing the electronic device 101.

According to various embodiments, the processor 120 may provide a risk notification when the user's gaze direction is facing the electronic device 101. When the user's gaze is facing the electronic device 101, the processor 120 may display the risk notification through the display module 160, and when the user's gaze is not facing the electronic device 101, the processor 120 may provide vibration for the risk notification through the haptic module 179, or output sound for the risk notification through the sound output module 155.

When connected to the vehicle 201, in operation 511, the processor 120 may acquire obstacle information from the vehicle 201. When located close to the vehicle 201, the processor 120 may connect to the vehicle 201 through the communication module 190 and receive obstacle information from the vehicle 201. The obstacle information may include obstacle location information or obstacle speed information. Alternatively, the vehicle 201 may calculate the distance between the electronic device 101 and the obstacle or the speed of the obstacle based on the current location of the electronic device 101 with respect to the recognized obstacle. In this case, the obstacle information may include the distance between the electronic device 101 and the obstacle or the speed of the obstacle. The vehicle 201 may determine what the obstacle is based on HD map information or an acquired image, and may further include the obstacle type (e.g., person, animal, or object) in the obstacle information and transmit the same. According to various embodiments, according to implementation, the vehicle 201 may not transmit the recognized obstacle information to the electronic device 101. When the vehicle 201 does not transmit the recognized obstacle information to the electronic device 101, operation 511 may be omitted. This is only an implementation issue, and the disclosure is not limited by description.

In operation 513, the processor 120 may track the user's gaze direction. When the posture of the electronic device 101 corresponds to a configured posture, when a touch input is detected, or when a specific application is executed, the processor 120 may determine that the user's gaze direction is facing the electronic device 101. The posture of the electronic device 101 may be acquired based on a sensor value acquired by using a gyro sensor. The processor 120 may determine that the user's gaze direction is facing the electronic device 101 when the posture of the electronic device 101 is determined to be the posture of using the electronic device 101 while the user is determined to be walking based on the sensor value acquired by the acceleration sensor. When a touch input is detected while the user is determined to be walking, the processor 120 may determine that the user's gaze direction is facing the electronic device 101. For example, in the case of a music application, the user's gaze direction may not be facing the electronic device 101 while the music is playing. However, in the case of a specific application (e.g., a game application, a YouTube application), the user's gaze may be facing the electronic device 101 while the application is running. The processor 120 may determine whether the currently running application corresponds to a specific application based on the identifier or type of the application configured in the application.

In operation 515, the processor 120 may determine a collision with the obstacle occurs. When connected to the vehicle 201, the processor 120 may further consider the obstacle information received from the vehicle 201 to determine whether there will be a collision with the obstacle. The processor 120 may calculate the distance between the obstacle recognized by the electronic device 101 or the obstacle recognized by the vehicle 201 and the electronic device 101, or calculate the approaching speed of the obstacle. The processor 120 may determine whether there will be a collision with the recognized obstacle based on the distance or speed of the obstacle. Because operation 515 is the same as or similar to operation 507 described above, a detailed description may be omitted.

In operation 517, the processor 120 may provide a risk notification through the vehicle 201 or the electronic device 101 based on the gaze direction. For example, when the user's gaze is facing the electronic device 101, the processor 120 may provide the risk notification through the display module 160, the haptic module 179, or the sound output module 155. Alternatively, the processor 120 may control to provide the risk notification through the vehicle 201 when the user's gaze direction is not facing the electronic device 101. Alternatively, the processor 120 may control to provide the risk notification through the electronic device 101 and the vehicle 201 when the user's gaze direction is facing the electronic device 101. Alternatively, the processor 120 may control to provide the risk notification through the wearable device and the vehicle 201 connected to the electronic device 101 when the user's gaze direction is facing the electronic device 101.

Figure 6A:
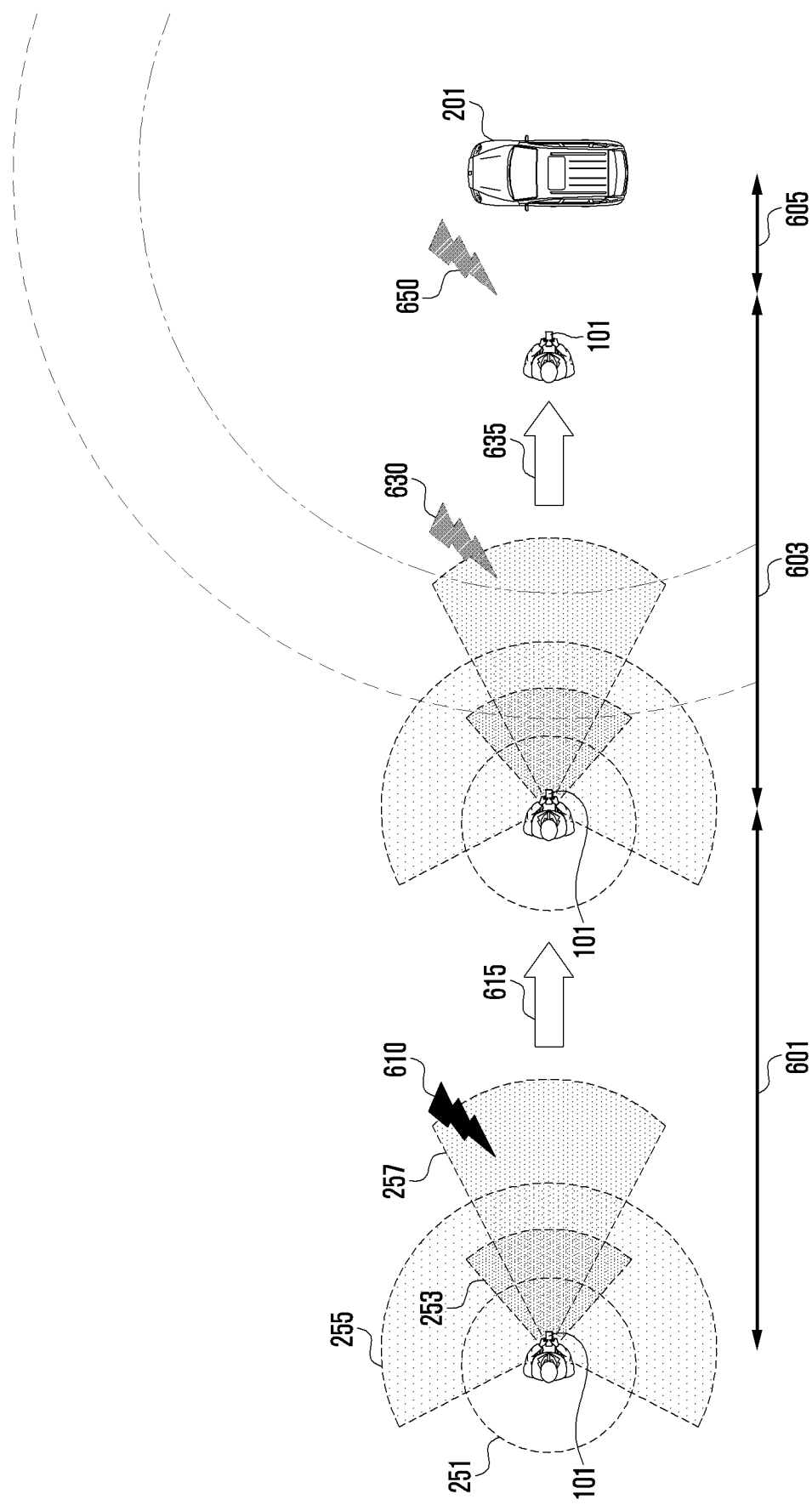
FIGS. 6A and 6B are diagrams illustrating an example of providing user feedback through an electronic device or a vehicle according to various embodiments of the disclosure.
Figure 6B:
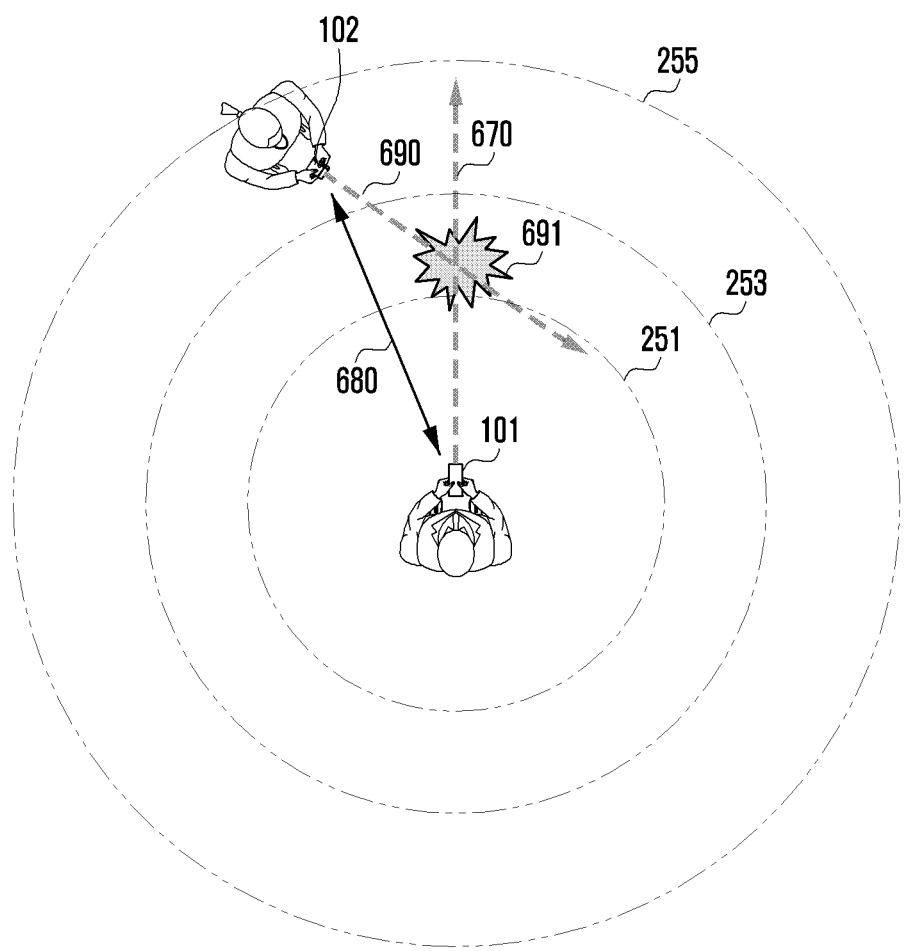

FIGS. 6A and 6B are diagrams illustrating an example of providing user feedback through an electronic device or a vehicle according to various embodiments of the disclosure.

FIG. 6A is a diagram illustrating an example of providing a risk notification through an electronic device or a vehicle according to a change in a location of the electronic device.

Referring to FIG. 6A, the electronic device (e.g., the electronic device 101 of FIG. 1) according to various embodiments may support safe walking of a user while the user moves in a first moving direction 615 by using at least one of a sensor module (e.g., the sensor module 176 of FIG. 1), a camera (e.g., the camera module 180 of FIG. 1), and a microphone (e.g., the input module 150 of FIG. 1). For example, when the vehicle (e.g., the vehicle 201 of FIG. 2) is separated by a first distance 601, the electronic device 101 may recognize an obstacle located within a first distance 251 by using the microphone, recognize an obstacle located within a second distance 253 by using the vision camera, recognize an obstacle located within a third distance 255 by using a short-range communication method, and may recognize an obstacle located within a fourth distance 257 by using the lidar. The first distance 251 may be shorter than the second distance 253, the second distance 253 may be shorter than the third distance 255, and the third distance 255 may be shorter than the fourth distance 257. While being separated from the vehicle 201 by the first distance 601, the electronic device 101 may recognize an obstacle, determine whether there is a recognized obstacle collision 610, and provide a risk notification based on the determination result.

While being separated from the vehicle 201 by the first distance 601, the electronic device 101 may determine that the user's gaze direction is facing the electronic device 101 when the posture of the electronic device 101 corresponds to a configured posture by tracking the user's gaze direction, a touch input is detected, or a specific application is executed. The electronic device 101 may provide a risk notification based on the gaze direction. When the user's gaze is facing the electronic device 101, the electronic device 101 may provide the risk notification through the display module 160, the haptic module 179, or the sound output module 155. Alternatively, the electronic device 101 may control to provide the risk notification through a wearable device connected to the electronic device 101 when the user's gaze direction is not facing the electronic device 101.

When the user is away from the vehicle 201 by the second distance 603 while continuing to move in the second moving direction 635, the electronic device 101 may determine whether it is possible to be connected to the vehicle 201. The electronic device 101 may be connected to the vehicle 201 through short-range wireless communication when entering within a predetermined distance that may be connected (or paired) with the vehicle 201. While being separated from the vehicle 201 by the second distance 603, the electronic device 101 may recognize an obstacle, determine whether there is a recognized obstacle collision 630, and provide a risk notification based on the determination result. When connected to the vehicle 201, the electronic device 101 may receive obstacle information from the vehicle 201, determine whether there is an obstacle collision 630 based on the obstacle information recognized by the electronic device 101 and the received obstacle information, and provide a risk notification based on the determination result. While being separated by the second distance 603 from the vehicle 201, the electronic device 101 may track the user's gaze direction and provide the risk notification based on the gaze direction.

When separated from the electronic device 101 by the second distance 603 and connected to the electronic device 101, the vehicle 201 may receive the expected moving path of the user or the current location of the electronic device 101 from the electronic device 101, recognize an obstacle to determine whether there is the obstacle collision 630, and provide a risk notification based on the determination result.

The second distance 603 may be a distance at which the vehicle 201 may be connected to the electronic device 101. The vehicle 201 may calculate the distance between the obstacle and the electronic device 101 based on the information received from the electronic device 101, and calculate the speed of the obstacle to determine whether there will be a collision with the obstacle. The vehicle 201 may provide a risk notification by turning on a light source or outputting a sound from a horn.

When separated from the vehicle 201 by the third distance 605, the electronic device 101 or the vehicle 201 may recognize an obstacle to determine whether there is the obstacle collision 650, and provide a risk notification based on the determination result. When separated by the third distance 605 from the vehicle 201, the electronic device 101 may track the user's gaze direction and provide the risk notification based on the gaze direction. For example, the electronic device 101 may control to provide the risk notification through the vehicle 201 when the user's gaze direction is not facing the electronic device 101. The electronic device 101 may control to provide the risk notification through the electronic device 101 and the vehicle 201 when the user's gaze direction is facing the electronic device 101. Alternatively, the electronic device 101 may control to provide the risk notification through the wearable device and the vehicle 201 connected to the electronic device 101 when the user's gaze direction is facing the electronic device 101.

When separated from the electronic device 101 by the third distance 605, the vehicle 201 may receive the expected moving path of the user or the current location of the electronic device 101 from the electronic device 101, recognize an obstacle to determine whether there is the obstacle collision 630, and provide a risk notification based on the determination result. The vehicle 201 may provide a risk notification by turning on a light source or outputting a sound from a horn.

FIG. 6B is a diagram illustrating an example of providing a risk notification through an electronic device.

Referring to FIG. 6B, the electronic device 101 may determine an expected moving path 670 based on location information of the vehicle 201 and the current location of the electronic device 101. The location information or a previous moving path of the vehicle 201 may be stored in a memory (e.g., the memory 130 of FIG. 1) of the electronic device 101. The electronic device 101 may calculate the expected moving path 670 by further considering the previous moving path. The electronic device 101 may recognize an obstacle on the expected moving path 670 and determine whether there will be a collision with the recognized obstacle. For example, the electronic device 101 may recognize an obstacle (e.g., a person) based on map information based on the current location of the electronic device 101, sensor values acquired from the sensor module (e.g., sensor module 176 of FIG. 1) and information acquired through short-range wireless communication 680. The electronic device 101 may recognize an obstacle located within the first distance 251 by using a microphone, recognize an obstacle located within the second distance 253 by using a vision camera, and recognize an obstacle located within the third distance 255 by using a short-range communication 680 method.

Hereinafter, the recognized obstacle will be described as an electronic device 102. The electronic device 101 may communicate with the electronic device 102 of another user through short-range wireless communication (e.g., V2X, UWB) 680, or may recognize the electronic device 102 through a lidar. The electronic device 101 may calculate (or predict) an expected moving path 690 of the electronic device 102 based on the distance to the electronic device 102 or the speed of the electronic device 102. The electronic device 101 may determine whether there will be a collision 691 with the electronic device 102 based on at least one of the expected moving path 670, the speed of the electronic device 101, the expected moving path 690 of the electronic device 102, the distance to the electronic device 102, or the speed of the electronic device 102. The electronic device 101 may provide a risk notification based on the determination result.

Figure 7:
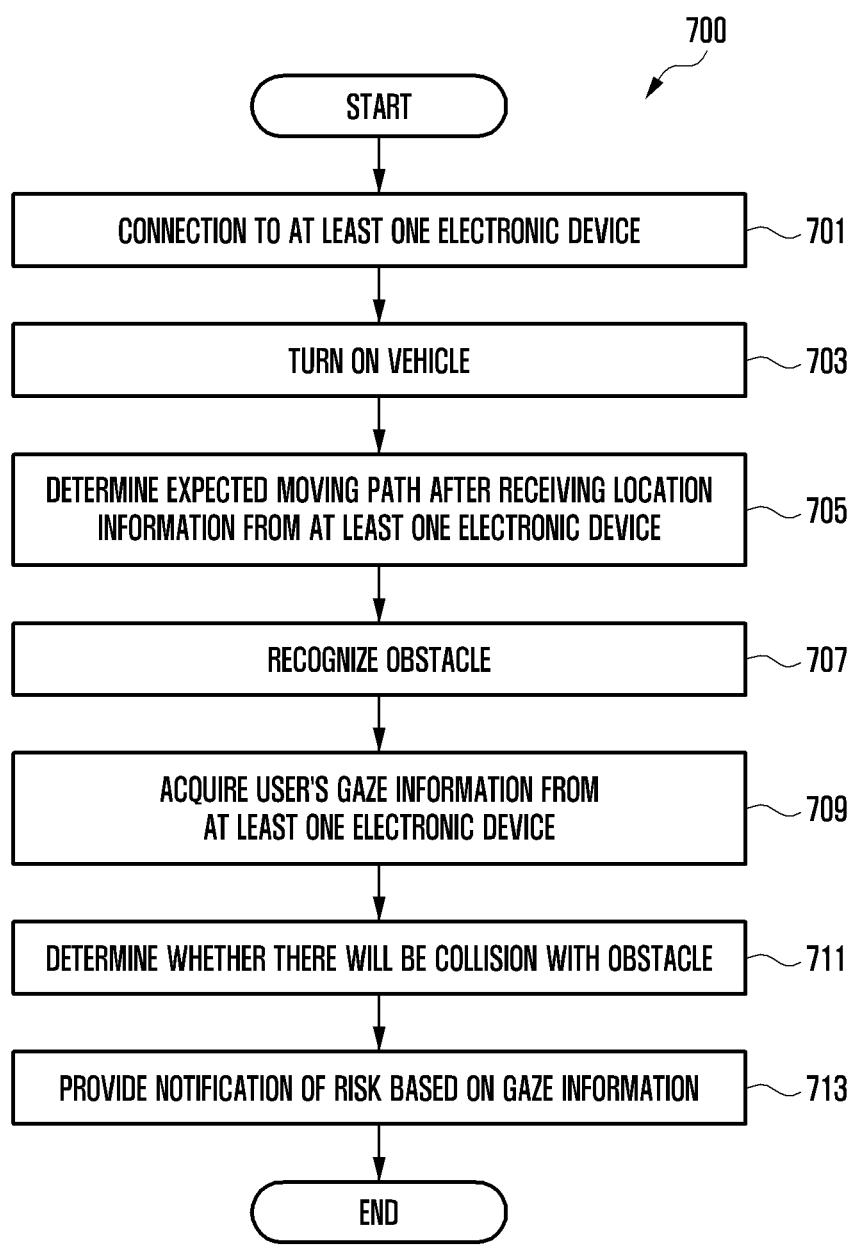
FIG. 7 is a flowchart illustrating a method of providing user feedback in a vehicle according to an embodiment of the disclosure.

FIG. 7 is a flowchart 700 illustrating a method of providing user feedback in a vehicle according to an embodiment of the disclosure.

Referring to FIG. 7, in operation 701, the processor (e.g., the processor 330 of FIG. 3) of the vehicle (e.g., the vehicle 201 of FIG. 2) according to various embodiments may be connected to at least one electronic device (e.g., the electronic device 101 of FIG. 1). The vehicle 201 may include (or be equipped with) a walking support device (or system) 301. The processor 330 may store information on the electronic device 101 connected even once in a memory (e.g., the memory 340 of FIG. 3). For example, the memory 340 may include information on the electronic device 101 of a first user who is the owner of the vehicle 201, information on a second electronic device (e.g., electronic device 102 of FIG. 1) of a second user (e.g., mom) who is a family member of the first user, information on a third electronic device (e.g., electronic device 104 of FIG. 1) of a third user (e.g., dad), and information on a fourth electronic device of a fourth user (e.g., a friend) who is an acquaintance of the first user. The at least one electronic device may include at least one of the electronic device 101 of a first user, the second electronic device 102, the third electronic device 104, and the fourth electronic device. The processor 330 may be connected to the at least one electronic device through short-range wireless communication (e.g., Bluetooth™, UWB) through a communication module (e.g., the communication module 360 of FIG. 3). Hereinafter, for convenience of description, the at least one electronic device will be described as the electronic device 101. However, the disclosure is not limited by the description.

In operation 703, the processor 330 may turn on the vehicle 201. For example, when connected to the electronic device 101, the processor 330 may receive a command (or instruction) from the electronic device 101 to at least one of turn on the power of the vehicle 201, turn on the ignition of the vehicle 201, turn on the engine of the vehicle 201. The processor 330 may at least one turn on the power of the vehicle 201, turn on the ignition of the vehicle 201, or turn on the engine of the vehicle 201 according to the command of the electronic device 101.

In operation 705, the processor 330 may receive location information from at least one electronic device (e.g., the electronic device 101) to determine an expected moving path of the user. The expected moving path may be a result of determining (or predicting or calculating) an expected moving path from the vehicle 201 to the vehicle 201 based on the location information of the vehicle 201 and the location information of the electronic device 101. Alternatively, the processor 330 may receive the expected moving path of the user together with the location information (e.g., current location) of the electronic device 101 from the electronic device 101 through the communication module 360. The processor 330 may receive the location information of the electronic device 101 in real time, periodically or selectively. Alternatively, the processor 330 may further receive a previous moving path of the electronic device 101 and use the same to determine the expected moving path. The previous moving path may be calculated based on the location information of the electronic device 101 while the electronic device 101 is moving away from the vehicle 201.

The drawing describes that operation 705 is performed after operation 703, but operation 705 may also be performed after being connected to the electronic device 101 (e.g., operation 701). Operation 705 may be performed simultaneously with operation 701 or operation 703. This is merely an implementation issue and does not limit the disclosure.

In operation 707, the processor 330 may recognize obstacles. The processor 330 may recognize obstacles located on the expected moving path based on the ADAS. For example, the processor 330 may recognize nearby obstacles based on at least one of the communication module 360, a camera (e.g., the vision camera 310 of FIG. 3), or a sensor module (e.g., the sensor module 320 of FIG. 3). For example, the processor 330 may acquire map information (e.g., HD map information) from a map information providing server (e.g., the server 108 of FIG. 1), recognize obstacles located in front and rear of the vehicle 201 through an ultrasonic sensor, or recognize obstacles through a camera (e.g., a front camera, a vision camera), a lidar, laser, and radar. Alternatively, the processor 330 may recognize obstacles located around the vehicle 201 by acquiring information from surrounding electronic devices, surrounding vehicles, and surrounding infrastructure through short-range communication such as V2X and UWB. The processor 330 may recognize an obstacle based on at least one of map information, a sensor value, an image, and the collected information. The processor 330 may transmit the recognized obstacle information to the electronic device 101. The obstacle information may include location information of the obstacle or speed information of the obstacle.

In operation 709, the processor 330 may acquire gaze information of the user from at least one electronic device (e.g., the electronic device 101). When the user walks while looking at the electronic device 101, it may be dangerous, so the electronic device 101 may determine whether the user sees the electronic device 101. The electronic device 101 may determine whether the user's gaze direction is facing the electronic device 101 based on sensor information acquired from the sensor module 176 such as an illumination sensor, a proximity sensor, motion a sensor, an acceleration sensor, and a gyro sensor, or images acquired from the camera module 180. The processor 330 may receive gaze information of the user from the electronic device 101 in real time, periodically, or selectively.

The drawing describes that operation 709 is performed after operation 707, but operation 709 may also be performed after operation 703. Alternatively, operation 709 may be performed simultaneously with operation 705. This is merely an implementation issue and does not limit the disclosure.

In operation 711, the processor 330 may determine whether there will be a collision with an obstacle. The processor 330 may determine whether the electronic device 101 collides with the obstacle based on the recognized obstacle or the location information of the electronic device 101. The processor 330 may receive obstacle information recognized by the electronic device 101 from the electronic device 101. At least one of obstacle location information, obstacle speed information, obstacle type information, or distance information between the obstacle and the electronic device 101 may be received as the obstacle information. The processor 330 may determine whether there will be a collision with the obstacle based on at least one of obstacle information recognized by the vehicle 201, obstacle information received from the electronic device 101, or the location information of the electronic device 101.

In operation 713, the processor 330 may notify of risk of collision with the obstacle based on gaze information. When the collision between the user and the obstacle is expected, the processor 330 may control to provide a notification of an obstacle collision risk through an output module. For example, the output module may include at least one of one or more light sources or one or more horns of the vehicle 201. The processor 330 may control to provide the notification of the obstacle collision risk by at least one of turning on one or more light sources or outputting sound from one or more horns. For example, the processor 330 may control to at least one of turn on a light source associated with a direction among a plurality of light sources respectively corresponding to different directions, based on the location of the obstacle or the location information of the electronic device 101. The processor 330 may control to turn on the left light source when the obstacle is located on the left side of the vehicle 201, and may turn on the right light source when the obstacle is located on the right side of the vehicle 201. Alternatively, the processor 330 may control to turn on the left light source when the electronic device 101 is located on the left side of the vehicle 201, and turn on the right light source when the electronic device 101 is located on the right side of the vehicle 201. The processor 330 may control to at least one of turn on a light source associated with a direction among a plurality of light sources respectively corresponding to different directions, or output sound at a sound level from the horn, based on the location of the obstacle or the location information of the electronic device 101.

According to various embodiments, the processor 330 may control to at least one of turn on a light source associated with a direction among a plurality of light sources respectively corresponding to different directions, set an intensity of the light output from a light source, or output sound at a sound level from the horn, according to the risk level. For example, when the risk level is collision, the processor 330 may determine that the risk is high and control to at least one of output a high-intensity of light from a light source or output sound at a high level from the horn. When the risk is high, the processor 330 may control to output the direction or the blinking pattern from one or more light sources differently. When the risk level is danger, the processor 330 may determine that the risk is an intermediate level and control to at least one of output an intermediate-intensity of light from a light source or output sound at an intermediate sound level from horn. When the risk level is medium, the processor 330 may control to output light from a light source corresponding to one direction. When the risk level is warning, the processor 330 may determine that the risk level is low and control to at least one of output a low-intensity of light from a light source or output sound at a low level form the horn. Alternatively, when the light sources of the vehicle 201 may control one or more of the light sources to output different colors, the vehicle 201 may output different colors of light according to the risk level.

Figure 8:
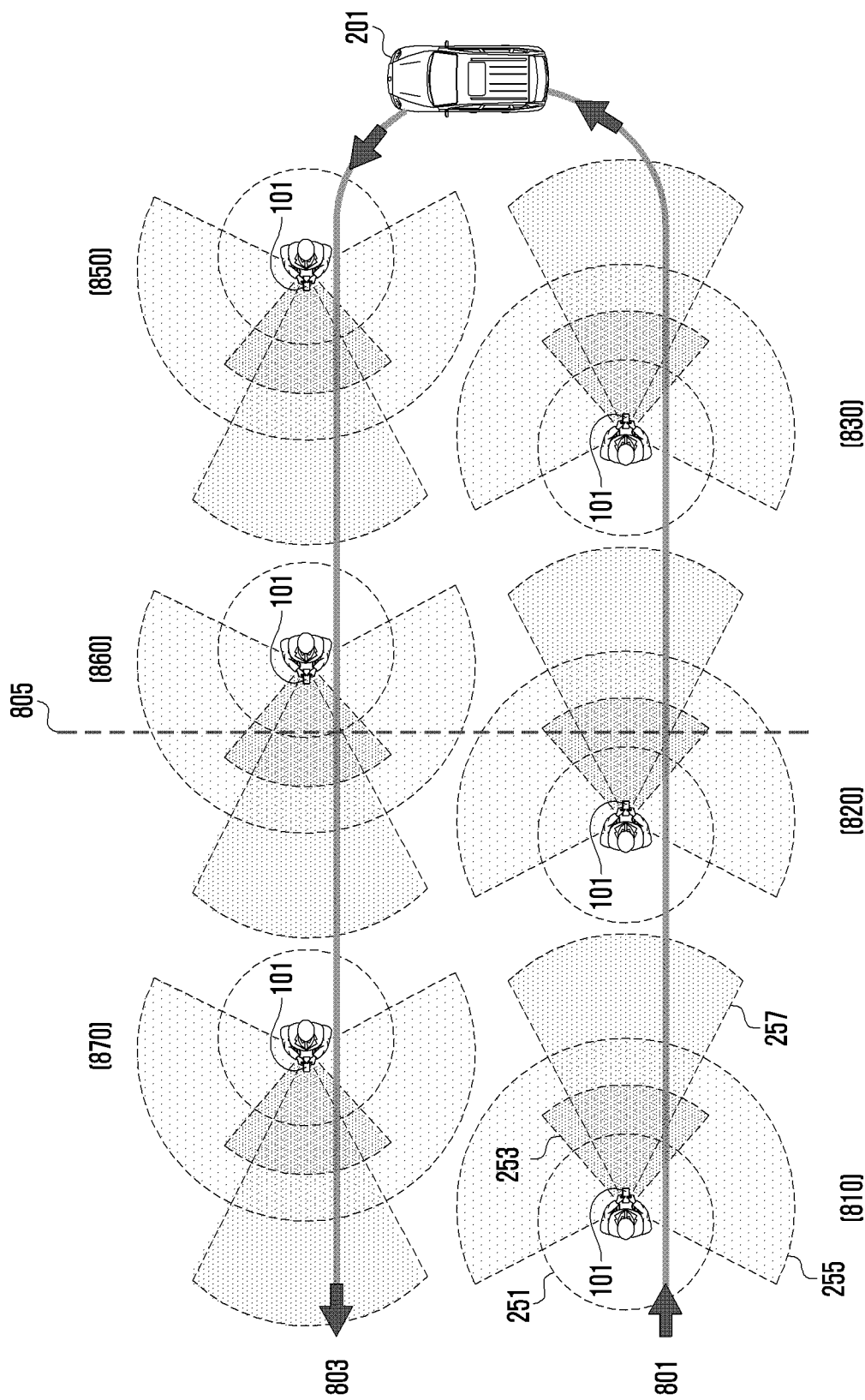
FIG. 8 is a diagram illustrating an example of providing user feedback through an electronic device or a vehicle based on a location change of the electronic device according to an embodiment of the disclosure.

FIG. 8 is a diagram illustrating an example of providing user feedback through an electronic device or a vehicle based on a location change of the electronic device according to an embodiment of the disclosure.

Referring to FIG. 8, an electronic device (e.g., the electronic device 101 of FIG. 1) according to various embodiments may execute advanced pedestrian assistance systems (APAS), and a vehicle (e.g., the vehicle 201 of FIG. 2) may execute ADAS to detect risk factors from all directions with the user as the central point. To this end, the electronic device 101 may acquire an expected moving path while moving to the vehicle 201, recognize an obstacle on the expected moving path, and notify of risk of collision with the recognized obstacle. The first expected moving path 801 may refer to a path along which a user carrying the electronic device 101 moves in the direction where the vehicle 201 is located. The second expected moving path 803 may refer to a path along which a user carrying the electronic device 101 moves in a direction away from the vehicle 201. The second expected moving path 803 may be the same as or different from the first expected moving path 801. The electronic device 101 may acquire the first expected moving path 801 and recognize an obstacle while sequentially moving from the first location 810 to the third location 830 on the first expected moving path 801 to notify of risk of collision with the recognized obstacle. The first location 810 may be farther from the vehicle 201 than the second location 820, and the second location 820 may be farther from the vehicle 201 than the third location 830. At the first location 810, the electronic device 101 may recognize an obstacle located within the first distance 251 by using a microphone, recognize an obstacle located within the second distance 253 by using a vision camera, and recognize an obstacle located within the third distance 255 by using a short-range communication method. Because the electronic device 101 may not connect to the vehicle 201 at the first location 810, the electronic device 101 may independently recognize the obstacle on the first expected moving path 801, determine whether there will be a collision with the recognized obstacle, and provide a risk notification.

At the second location 820, the electronic device 101 may recognize the obstacle, determine whether there will be a collision with the recognized obstacle, and provide a risk notification. When deviating from a predetermined distance 805 from the vehicle 201 at the second location 820, the electronic device 101 may independently recognize the obstacle on the first expected moving path 801, determine whether there will be a collision with the recognized obstacle, and provide a risk notification. When entering within the predetermined distance 805 from the vehicle 201, the electronic device 101 may interwork with the vehicle 201 to determine whether there will be a collision with the obstacle and provide a risk notification. When entering within the predetermined distance 805 from the vehicle 201, the electronic device 101 may connect to the vehicle 201 to at least one of turn on the power of the vehicle 201, turn on the ignition of the vehicle 201, or turn on the engine of the vehicle 201. The electronic device 101 may transmit the first expected moving path 801 or location information (e.g., current location) of the electronic device 101 to the vehicle 201 and receive obstacle information from the vehicle 201. The obstacle information may include information on the obstacle recognized by the vehicle 201. The electronic device 101 may transmit the obstacle information recognized by the electronic device 101 to the vehicle 201. When connected to the electronic device 101, the vehicle 201 may determine whether there will be a collision with the obstacle based on location information of the electronic device 101, speed of the electronic device 101, recognized obstacles, or the obstacle information received from the electronic device 101.

At the third location 830, the electronic device 101 may recognize the obstacle, determine whether there will be a collision with the recognized obstacle, and provide a risk notification. Because the electronic device 101 is connected to the vehicle 201 at the third location 830, the electronic device 101 may interwork with the vehicle 201 to determine whether there will be a collision with the obstacle and provide a risk notification. The electronic device 101 may determine whether there will be a collision with the obstacle based on the location information of the electronic device 101, the speed of the electronic device 101, the recognized obstacle, or the obstacle information received from the vehicle 201 to provide a risk notification. The vehicle 201 may determine whether there will be a collision with the obstacle based on location information of the electronic device 101, speed of the electronic device 101, recognized obstacles, or the obstacle information received from the electronic device 101.

The electronic device 101 may acquire the second expected moving path 803 and recognize an obstacle while sequentially moving from the fourth location 850 to the sixth location 870 on the second expected moving path 803 to notify of risk of collision with the recognized obstacle. The fourth location 850 may be closer to the vehicle 201 than the fifth location 860, and the fifth location 860 may be closer to the vehicle 201 than the sixth location 870. Because the electronic device 101 is connected to the vehicle 201 at the fourth location 850, the electronic device 101 may interwork with the vehicle 201 to recognize an obstacle on the second expected moving path 803, determine whether there will be a collision with the obstacle, and provide a risk notification.

At the fourth location 850, the electronic device 101 may recognize the obstacle, determine whether there will be a collision with the recognized obstacle, and provide a risk notification. The current location of the electronic device 101 and the second expected moving path 803 may be transmitted. The vehicle 201 may provide a risk notification by determining whether there will be a collision with the obstacle based on the location information of the electronic device 101, the speed of the electronic device 101, the recognized obstacle, or the obstacle information received from the electronic device 101. The vehicle 201 may recognize the obstacle on the second expected moving path 803 and transmit information on the recognized obstacle to the electronic device 101. The electronic device 101 may provide a risk notification by determining whether there will be a collision with the obstacle based on the location information of the electronic device 101, the speed of the electronic device 101, the recognized obstacle, or the obstacle information received from the vehicle 201.

At the fifth location 860, when the electronic device 101 is located within the predetermined distance 805 from the vehicle 201, the electronic device 101 may interwork with the vehicle 201 to determine whether there will be a collision with the obstacle and provide a risk notification. At the fifth location 860, when deviating from the predetermined distance 805 from the vehicle 201, the electronic device 101 may independently recognize the obstacle on the second expected moving path 803, determine whether there will be a collision with the recognized obstacle, and provide a risk notification. The electronic device 101 may at last one of turn off the power of the vehicle 201, turn off the ignition of the vehicle 201, or turn off the engine of the vehicle 201 when the electronic device 101 deviates from the predetermined distance 805 from the vehicle 201 at the fifth location 860. The electronic device 101 may transmit the second expected moving path 803 or location information (e.g., current location) of the electronic device 101 to the vehicle 201 and receive obstacle information from the vehicle 201. The electronic device 101 may provide a risk notification by determining whether there will be a collision with the obstacle based on the location information of the electronic device 101, the speed of the electronic device 101, the recognized obstacle, or the obstacle information received from the electronic device 101.

At the sixth location 870, the electronic device 101 may recognize the obstacle, determine whether there will be a collision with the recognized obstacle, and provide a risk notification. Because the electronic device 101 is not connected to the vehicle 201 at the sixth location 870, the electronic device 101 may independently determine whether there will be a collision with the obstacle and provide a risk notification. The electronic device 101 may determine whether there will be a collision with the obstacle based on the location information of the electronic device 101, the speed of the electronic device 101, the recognized obstacle to provide a risk notification.

Figure 9:
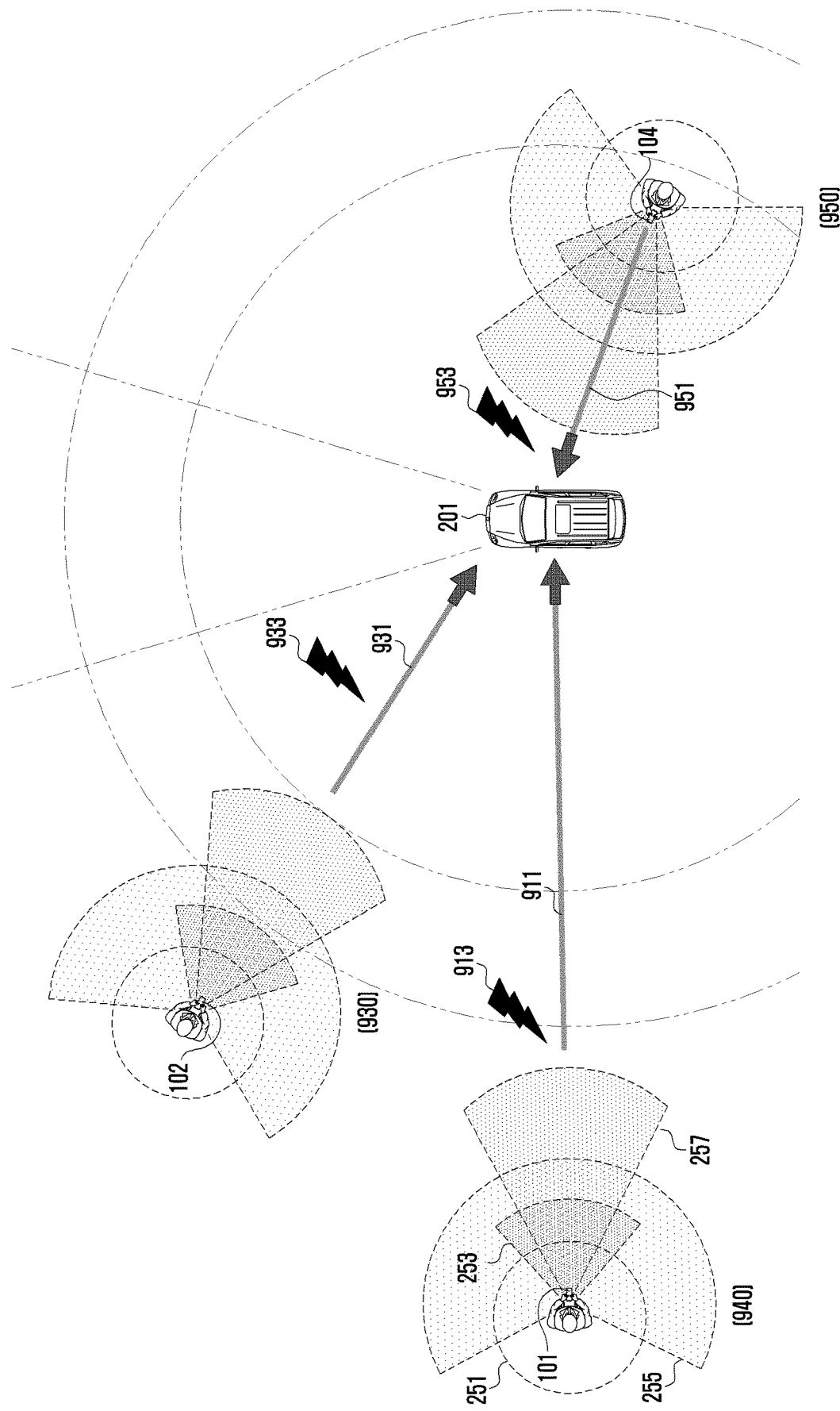
FIG. 9 is a diagram illustrating an example of providing user feedback through a plurality of electronic devices connected to a vehicle according to an embodiment of the disclosure.

FIG. 9 is a diagram illustrating an example of providing user feedback through a plurality of electronic devices connected to a vehicle according to an embodiment of the disclosure.

Referring to FIG. 9, the vehicle according to various embodiments (e.g., the vehicle 201 of FIG. 2) may be connected to a plurality of electronic devices to provide notification of a risk of collision with an obstacle. For example, the plurality of electronic devices are electronic devices that have been connected to the vehicle 201 at least once, may include, for example, a first electronic device (e.g., the electronic device 101 of FIG. 1), a second electronic device (e.g., the electronic device 102 of FIG. 1), and a third electronic device (e.g., the electronic device 104 of FIG. 1). Hereinafter, the electronic device 101 will be described as the first electronic device 101, the electronic device 102 will be described as the second electronic device 102, and the electronic device 104 will be described as the third electronic device 104. For example, the first electronic device 101 may be an electronic device of a first user (e.g., the owner of the vehicle 201), the second electronic device 102 may be an electronic device of a second user (e.g., family 1 of the first user), and the third electronic device 104 may be an electronic device of a third user (e.g., family 2 of the first user).

The first electronic device 101 may recognize an obstacle located within the first distance 251 by using the microphone, recognize an obstacle located within the second distance 253 by using the vision camera, recognize an obstacle located within the third distance 255 by using a short-range communication method, and may recognize an obstacle located within the fourth distance 257 by using the lidar. The second electronic device 102 and the third electronic device 104 may also recognize obstacles identically or similarly to the first electronic device 101.

The first electronic device 101 may acquire a first expected moving path 911 based on the location information of the vehicle 201 or the location information of the first electronic device 101 at a first location 940, recognize an obstacle on the first expected moving path 911, determine whether there will be a collision 913 with the recognized obstacle, and provide a risk notification based on the determination result. When entering within a predetermined distance from the vehicle 201, the first electronic device 101 may transmit the first expected moving path 911 and location information of the first electronic device 101 to the vehicle 201 and receive first obstacle information from the vehicle 201. The vehicle 201 may recognize the obstacle based on the first expected moving path 911 and the location information of the first electronic device 101 and transmit the recognized first obstacle information to the first electronic device 101. The first electronic device 101 may further consider the first obstacle information to determine whether there will be a collision 913 with the recognized obstacle. The vehicle 201 may turn on a light source associated with a direction among a plurality of light sources respectively corresponding to different directions based on the location of the obstacle or the location information of the first electronic device 101. The vehicle 201 may turn on the left light source or output sound at a sound level from the horn as a risk notification to the first electronic device 101.

The second electronic device 102 may acquire a second expected moving path 931 based on the location information of the vehicle 201 or the location information of the second electronic device 102 at a second location 930, recognize an obstacle on the second expected moving path 931, determine whether there will be a collision 933 with the recognized obstacle, and provide a risk notification based on the determination result. The second expected moving path 931 may be the same as or different from the first expected moving path 911. When entering within a predetermined distance from the vehicle 201, the second electronic device 102 may transmit the second expected moving path 931 and location information of the second electronic device 102 to the vehicle 201 and receive second obstacle information from the vehicle 201. The vehicle 201 may recognize the obstacle based on the second expected moving path 931 and the location information of the second electronic device 102 and transmit the recognized second obstacle information to the second electronic device 102. The second electronic device 102 may further consider the second obstacle information to determine whether there will be a collision 933 with the recognized obstacle. The vehicle 201 may turn on a light source associated with a direction among a plurality of light sources respectively corresponding to different directions based on the location of the obstacle or the location information of the second electronic device 102. The vehicle 201 may turn on the left light source or output sound at a sound level from the horn as a risk notification to the second electronic device 102.

The third electronic device 104 may acquire a third expected moving path 951 based on the location information of the vehicle 201 or the location information of the third electronic device 104 at a third location 950, recognize an obstacle on the third expected moving path 951, determine whether there will be a collision 953 with the recognized obstacle, and provide a risk notification based on the determination result. The third expected moving path 951 may be the same as or different from the second expected moving path 931 or the first expected moving path 911. When entering within a predetermined distance from the vehicle 201, the third electronic device 104 may transmit the third expected moving path 951 and location information of the third electronic device 104 to the vehicle 201 and receive third obstacle information from the vehicle 201. The vehicle 201 may recognize the obstacle based on the third expected moving path 951 and the location information of the third electronic device 104 and transmit the recognized third obstacle information to the third electronic device 104. The third electronic device 104 may further consider the third obstacle information to determine whether there will be a collision 953 with the recognized obstacle. The vehicle 201 may turn on a light source associated with a direction among a plurality of light sources respectively corresponding to different directions based on the location of the obstacle or the location information of the third electronic device 104. The vehicle 201 may turn on the left light source or output sound at a sound level from the horn as a risk notification to the third electronic device 104.

Figure 10:
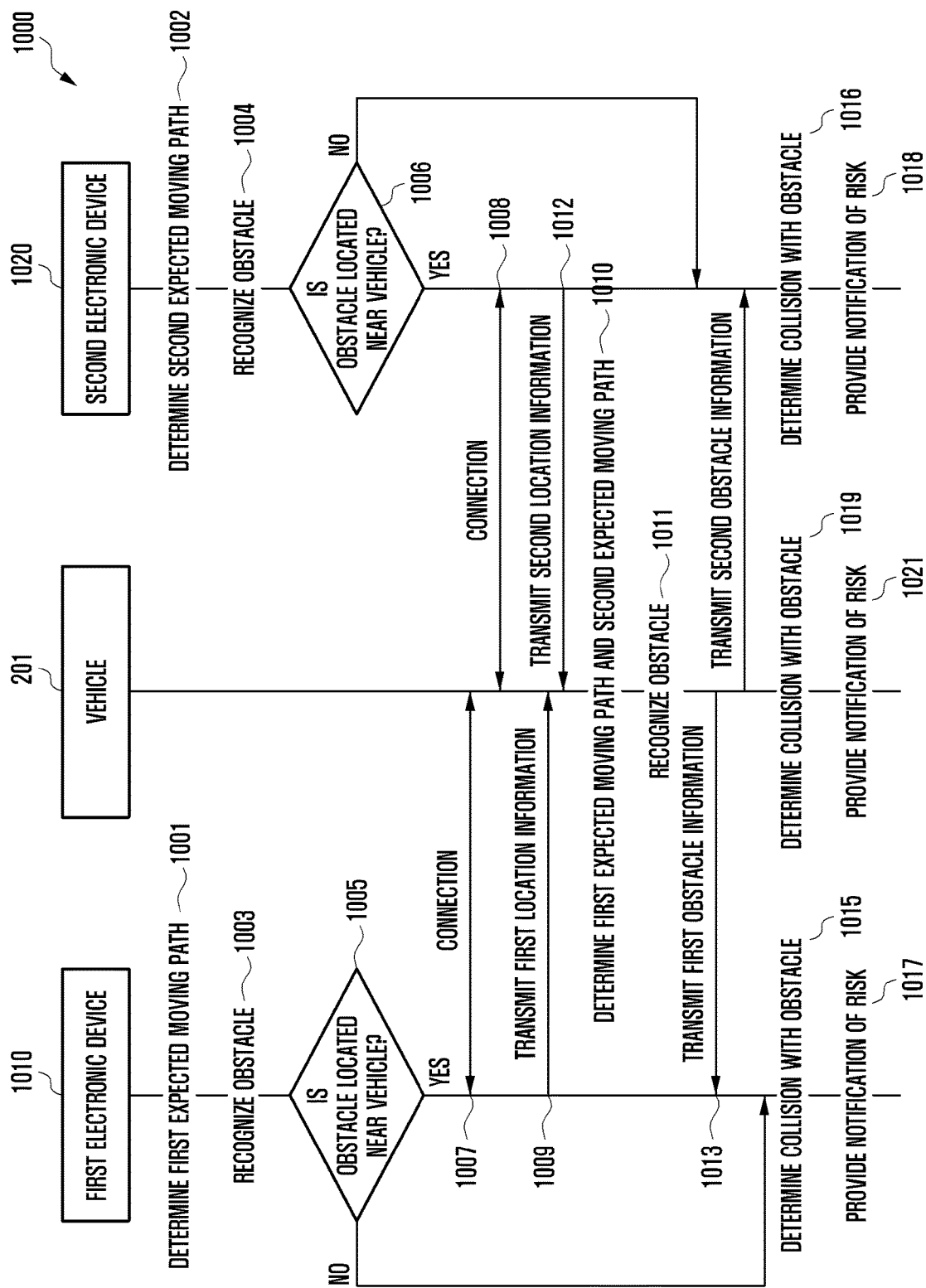
FIG. 10 is a flowchart illustrating a method of providing user feedback through a vehicle and a plurality of electronic devices according to an embodiment of the disclosure.

FIG. 10 is a flowchart illustrating a method of providing user feedback through a vehicle and a plurality of electronic devices according to an embodiment of the disclosure.

Referring to FIG. 10, a first electronic device 1010 (e.g., the electronic device 101 of FIG. 1) according to various embodiments may determine a first expected moving path in operation 1001. The first expected moving path may refer to a path in which a first user with the first electronic device 1010 moves in the direction of the vehicle (e.g., the vehicle 201 of FIG. 2) or moves away (or escapes) from the vehicle 201. The first electronic device 1010 may calculate the first expected moving path based on at least one of the location information of the vehicle 201 stored in a memory (e.g., the memory 130 of FIG. 1) and the current location of the first electronic device 1010. The first electronic device 1010 may further store the previous moving path in the memory 130. The previous moving path may be calculated based on a change in the location of the first electronic device 1010 over time while the first electronic device 1010 stores the location information of the vehicle 201 and then moves away from the vehicle 201. The first electronic device 1010 may determine the first expected moving path by further considering the previous moving path.

In operation 1003, the first electronic device 1010 may recognize obstacles located on the first expected moving path. The obstacles may interfere with or hinder the user's safe walking. For example, the obstacles may refer to telephone poles, traffic lights, railroad tracks, signboards, other users, bicycles, motorcycles, cars, and the like. The first electronic device 1010 may acquire the current location of the first electronic device 1010 in real time through a location recognition module, and acquire map information within a configured distance (e.g., 1 m, 3 m, or 5 m) based on the current location from a map information providing server (e.g., the server 108 of FIG. 1). The first electronic device 1010 may recognize the obstacle based on at least one of the map information, a sensor value acquired from a sensor module (e.g., the sensor module 176 of FIG. 1), an image acquired from a vision camera (e.g., the camera module 180 of FIG. 1) or a sound acquired from a microphone (e.g., the input module 150 of FIG. 1).

In operation 1005, the first electronic device 1010 may determine whether the first electronic device is located close to the vehicle 201. When located close to the vehicle 201 (e.g., within the predetermined distance 230 of FIG. 2), the first electronic device 1010 may be wirelessly connected to the vehicle 201. When the first electronic device 1010 is not located close to the vehicle 201, the first electronic device 1010 may not be connected to the vehicle 201. When the first electronic device 1010 is located close to the vehicle 201, operation 1007 may be performed, and when the first electronic device 1010 is not located close to the vehicle 201, operation 1015 may be performed.

When located close to the vehicle 201, in operation 1007, the first electronic device 1010 may be connected to the vehicle 201. For example, the first electronic device 1010 may be connected to the vehicle 201 through short-range wireless communication such as Bluetooth™, Bluetooth™ Low Energy, Wi-Fi, Wi-Fi Direct, or UWB. The first electronic device 1010 may be connected to the vehicle 201 by transmitting subscriber information (e.g., International Mobile Subscriber Identifier (IMSI) stored in the subscriber identification module 196 of FIG. 1. When wirelessly connected to the vehicle 201, the first electronic device 1010 may turn on the power of the vehicle 201 or control the vehicle 201 to be started.

In operation 1009, the first electronic device 1010 may transmit location information of the first electronic device 1010 to the vehicle 201. The first electronic device 1010 may transmit the current location of the first electronic device 1010 to the vehicle 201 in real time, periodically, or selectively. Alternatively, the first electronic device 1010 may transmit the first expected moving path together with the current location of the first electronic device 1010.

In operation 1002, a second electronic device 1020 (e.g., the electronic device 102 of FIG. 1) according to various embodiments may determine a second expected moving path. The second expected moving path may refer to a path in which a second user with the second electronic device 1020 moves in the direction of the vehicle 201 or moves away (or escapes) from the vehicle 201. The second expected moving path may be the same as or different from the first expected moving path. The second electronic device 1020 may calculate the second expected moving path based on at least one of the location information of the vehicle 201 stored in a memory (e.g., the memory 130 of FIG. 1) and the current location of the second electronic device 1020. The second electronic device 1020 may calculate the second expected moving path by further considering the previous moving path stored in the memory 130. The previous moving path may be calculated based on a change in the location of the second electronic device 1020 over time while the second electronic device 1020 stores the location information of the vehicle 201 and then moves away from the vehicle 201.

In operation 1004, the second electronic device 1020 may recognize obstacles located on the second expected moving path. The second electronic device 1020 may acquire the current location of the second electronic device 1020 in real time, and acquire map information within a configured distance (e.g., 1 m, 3 m, or 5 m) based on the current location. The second electronic device 1020 may recognize the obstacle based on at least one of the map information, a sensor value acquired from a sensor module (e.g., the sensor module 176 of FIG. 1), an image acquired from a vision camera (e.g., the camera module 180 of FIG. 1) or a sound acquired from a microphone (e.g., the input module 150 of FIG. 1).

In operation 1006, the second electronic device 1020 may determine whether the second electronic device is located close to the vehicle 201. When located close to the vehicle 201 (e.g., within the predetermined distance 230 of FIG. 2), the second electronic device 1020 may be wirelessly connected to the vehicle 201. When the second electronic device 1020 is not located close to the vehicle 201, the second electronic device 1020 may not be connected to the vehicle 201. When the second electronic device 1020 is located close to the vehicle 201, operation 1008 may be performed, and when the second electronic device 1020 is not located close to the vehicle 201, operation 1016 may be performed.

When located close to the vehicle 201, in operation 1008, the second electronic device 1020 may be connected to the vehicle 201. For example, the second electronic device 1020 may be connected to the vehicle 201 through short-range wireless communication such as Bluetooth™, Bluetooth™ Low Energy, Wi-Fi, Wi-Fi Direct, or UWB. The second electronic device 1020 may be connected to the vehicle 201 by transmitting subscriber information (e.g., International Mobile Subscriber Identifier (IMSI) stored in the subscriber identification module 196 of FIG. 1. When wirelessly connected to the vehicle 201, the second electronic device 1020 may turn on the power of the vehicle 201 or control the vehicle 201 to be started.

In operation 1012, the second electronic device 1020 may transmit second location information of the second electronic device 1020 to the vehicle 201. The second electronic device 1020 may transmit the current location of the second electronic device 1020 to the vehicle 201 in real time, periodically, or selectively. Alternatively, the second electronic device 1020 may transmit the second expected moving path together with the current location of the second electronic device 1020.

In the drawings, operations 1001 to 1009 are illustrated to be performed before operations 1002 to 1012, but operations 1002 to 1012 may be performed earlier than operations 1001 to 1009, or operations 1002 to 1012 may be performed simultaneously with operations 1001 to 1009. The examples are merely for helping understanding of the disclosure, and the disclosure is not limited by the examples.

In operation 1010, the vehicle 201 may determine the first expected moving path and the second expected moving path. The vehicle 201 may determine the first expected moving path based on the current location of the first electronic device 1010 and location information of the vehicle 201. The vehicle 201 may determine the second expected moving path based on the current location of the second electronic device 1020 and location information of the vehicle 201. Alternatively, the vehicle 201 may receive the first expected moving path from the first electronic device 1010 or the second expected moving path from the second electronic device 1020. When the vehicle 201 receives the expected moving path from the first electronic device 1010 and the second electronic device 1020 respectively, operation 1010 may be omitted.

In operation 1011, the vehicle 201 may detect (or recognize) nearby obstacles based on ADAS. The vehicle 201 may include the walking support device 301 of FIG. 3. The vehicle 201 may recognize obstacles around the first electronic device 1010 based on at least one of the current location of the first electronic device 1010, the first expected moving path, a sensor value (e.g., acquired from the sensor module 320), an image (e.g., acquired from the sensor module 320), or collected information (e.g., acquired from the communication module 360 of FIG. 3). In addition, the vehicle 201 may recognize obstacles around the second electronic device 1020 based on at least one of the current location of the second electronic device 1020, the second expected moving path, a sensor value (e.g., acquired from the sensor module 320), an image (e.g., acquired from the sensor module 320), or collected information (e.g., acquired from the communication module 360 of FIG. 3).

In operation 1013, the vehicle 201 may transmit first obstacle information including obstacles around the first electronic device 1010 to the first electronic device 1010. The first obstacle information may include location information or speed information of obstacles located (or present) around the first electronic device 1010. Alternatively, the vehicle 201 may calculate the distance between the first electronic device 1010 and the obstacle or the speed of the obstacle based on the current location of the first electronic device 1010 with respect to the recognized obstacle. In this case, the first obstacle information may include the distance between the first electronic device 1010 and the obstacle or the speed of the obstacle. The vehicle 201 may determine what the obstacle is from HD map information or the acquired image, and may further include the type of obstacle (e.g., person, animal, or object) in the first obstacle information and transmit the same.

In operation 1014, the vehicle 201 may transmit second obstacle information including obstacles around the second electronic device 1020 to the second electronic device 1020. The second obstacle information may include location information or speed information of obstacles located (or present) around the second electronic device 1020. The second obstacle information may be the same as or different from the first obstacle information. Alternatively, the vehicle 201 may calculate the distance between the second electronic device 1020 and the obstacle or the speed of the obstacle based on the current location of the second electronic device 1020 with respect to the recognized obstacle. In this case, the second obstacle information may include the distance between the second electronic device 1020 and the obstacle or the speed of the obstacle. The vehicle 201 may determine what the obstacle is from HD map information or the acquired image, and may further include the type of obstacle (e.g., person, animal, or object) in the second obstacle information and transmit the same.

In operation 1015, the first electronic device 1010 may determine a collision with the obstacle occurs. When not located close to the vehicle 201, the first electronic device 1010 may determine whether there is an obstacle collision without connection with the vehicle 201. The first electronic device 1010 may determine whether there will be a collision with the obstacle by calculating the distance to the obstacle until connected to the vehicle 201, or by calculating the approaching speed of the obstacle. When connected to the vehicle 201, the first electronic device 1010 may further consider the first obstacle information received from the vehicle 201 to determine whether there will be a collision with the obstacle. The first electronic device 1010 may calculate the distance between the obstacle recognized by the first electronic device 1010 or the obstacle recognized by the vehicle 201 and the first electronic device 1010, or calculate the approaching speed of the obstacle. The first electronic device 1010 may determine whether there will be a collision with the recognized obstacle based on the distance or speed of the obstacle.

In operation 1017, the first electronic device 1010 may notify of risk based on the collision with the obstacle. For example, the obstacle guidance information indicates what the obstacle is, and for example, may include at least one of text, image, or video. The first electronic device 1010 may display obstacle guidance information or a notification of an obstacle collision risk on a display (e.g., the display module 160 of FIG. 1), control the haptic module 179 of FIG. 1 to provide obstacle guidance information or vibration for obstacle collision risk, or output the obstacle guidance information or sound (e.g., warning sound, voice) for the notification of the obstacle collision risk through the sound output module 155.

In operation 1016, the second electronic device 1020 may determine a collision with the obstacle occurs. When not located close to the vehicle 201, the second electronic device 1020 may determine whether there is an obstacle collision without connection with the vehicle 201. The second electronic device 1020 may determine whether there will be a collision with the obstacle by calculating the distance to the obstacle until connected to the vehicle 201, or by calculating the approaching speed of the obstacle. When connected to the vehicle 201, the second electronic device 1020 may further consider the second obstacle information received from the vehicle 201 to determine whether there will be a collision with the obstacle. The second electronic device 1020 may calculate the distance between the obstacle recognized by the second electronic device 1020 or the obstacle recognized by the vehicle 201 and the second electronic device 1020, or calculate the approaching speed of the obstacle. The second electronic device 1020 may determine whether there will be a collision with the recognized obstacle based on the distance or speed of the obstacle.

In operation 1018, the second electronic device 1020 may notify of risk based on the collision with the obstacle. For example, the obstacle guidance information indicates what the obstacle is, and for example, may include at least one of text, image, or video. The second electronic device 1020 may display obstacle guidance information or a notification of an obstacle collision risk on a display (e.g., the display module 160 of FIG. 1), control the haptic module 179 of FIG. 1 to provide obstacle guidance information or vibration for obstacle collision risk, or output the obstacle guidance information or sound (e.g., warning sound, voice) for the notification of the obstacle collision risk through the sound output module 155.

In the drawings, operations 1015 to 1017 are described to be performed before operations 1016 to 1018, but operations 1016 to 1018 may be performed earlier than operations 1015 to 1017, or may be performed simultaneously with operations 1015 to 1017. The examples are merely for helping understanding of the disclosure, and the disclosure is not limited by the examples.

In operation 1019, the vehicle 201 may determine whether the first electronic device 1010 collides with the obstacle or determine whether the second electronic device 1020 collides with the obstacle. For example, the vehicle 201 may determine whether there will be a collision with the recognized obstacle based on the recognized obstacle or location information of the first electronic device 1010. The vehicle 201 may receive obstacle information recognized by the electronic device 101 or location information of the first electronic device 1010 from the first electronic device 1010. The received obstacle information may include at least one of obstacle location information, obstacle speed information, obstacle type information, or distance information between the obstacle and the first electronic device 1010. The vehicle 201 may determine whether there will be a collision with an obstacle based on at least one of the obstacle information recognized by the vehicle 201, the obstacle information received from the first electronic device 1010, or the location information of the first electronic device 1010.

Alternatively, the vehicle 201 may determine whether there will be a collision with the recognized obstacle based on the recognized obstacle or location information of the second electronic device 1020. The vehicle 201 may receive obstacle information recognized by the electronic device 101 or location information of the second electronic device 1020 from the second electronic device 1020. The received obstacle information may include at least one of obstacle location information, obstacle speed information, obstacle type information, or distance information between the obstacle and the second electronic device 1020. The vehicle 201 may determine whether there will be a collision with an obstacle based on at least one of the obstacle information recognized by the vehicle 201, the obstacle information received from the second electronic device 1020, or the location information of the second electronic device 1020.

In operation 1021, the vehicle 201 may notify of risk based on the collision with the obstacle. When a collision between the first electronic device 1010 or the second electronic device 1020 and an obstacle is expected, the vehicle 201 may turn on a light source of the vehicle 201 or output sound from a horn. The vehicle 201 may provide a risk of collision with the obstacle by turning on a light or sounding a horn. For example, the vehicle 201 may turn on the left light source or output sound from the horn as a risk notification to the first electronic device 1010. The vehicle 201 may turn on a right light source or output sound from the horn as a risk notification to the second electronic device 1020. The vehicle 201 may at least one of turn on a light source associated with a direction among a plurality of light sources respectively corresponding to different directions, set an intensity of a light source, or sound level of the horn differently according to the risk level.

Figure 11A:
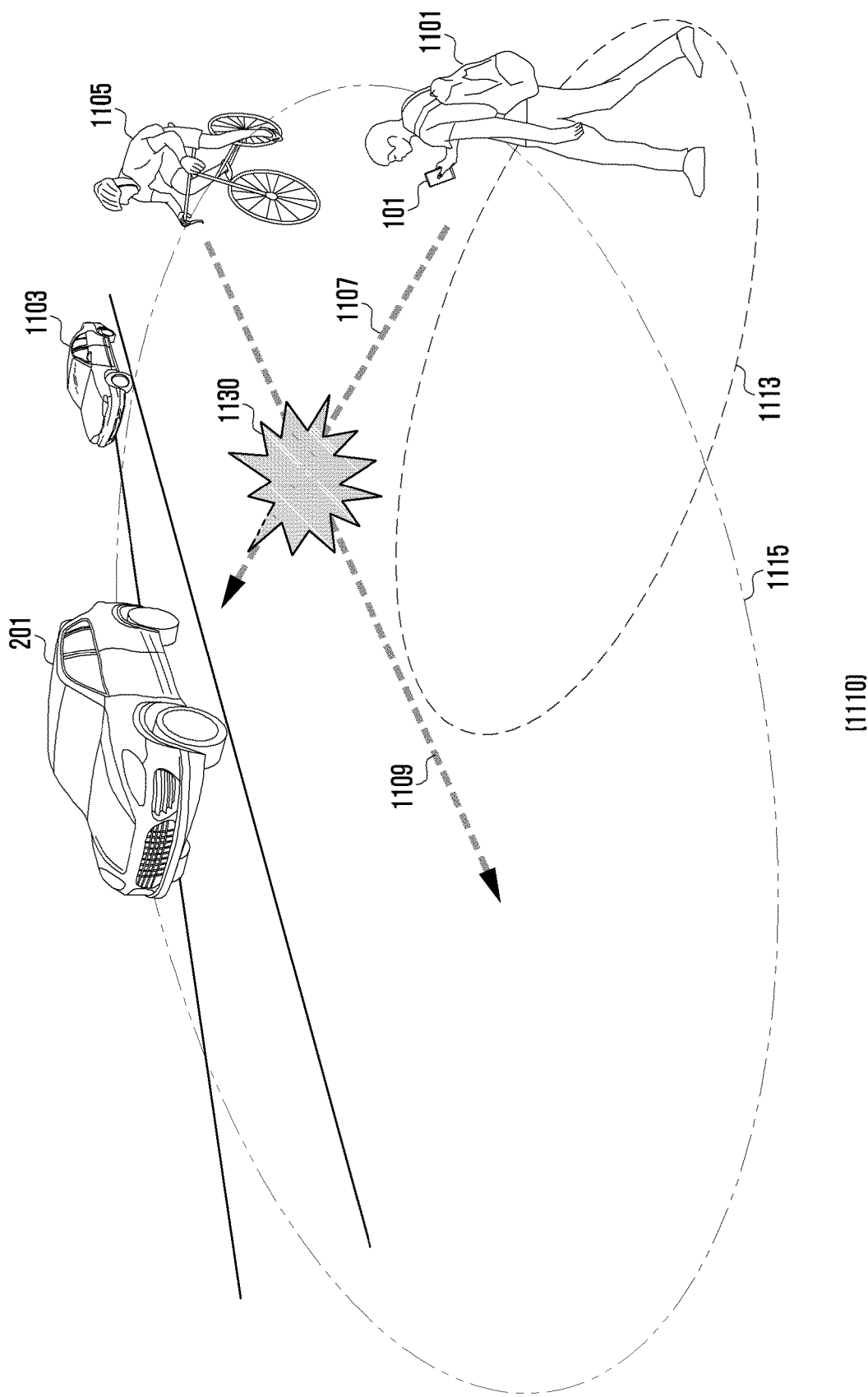
FIGS. 11A and 11B are diagrams illustrating an example of guiding a collision risk through an electronic device or a vehicle according to various embodiments of the disclosure.
Figure 11B:
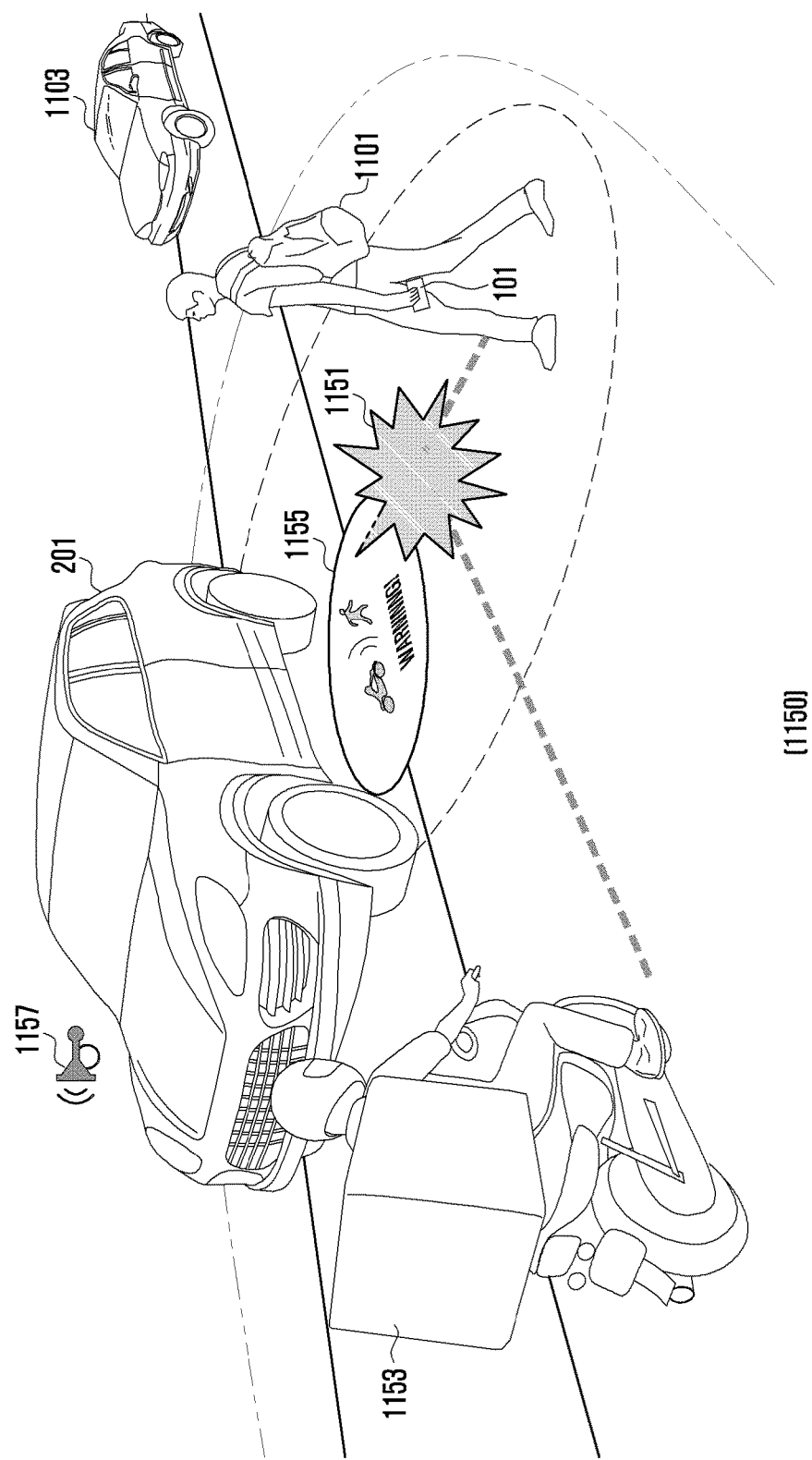

FIGS. 11A and 11B are diagrams illustrating an example of guiding a collision risk through an electronic device or a vehicle according to various embodiments of the disclosure.

FIG. 11A is a diagram illustrating an example of guiding a collision risk through an electronic device or a vehicle according to various embodiments.

Referring to FIG. 11A, the first situation 1110 may be a state in which a first obstacle recognition radius 1113 of the electronic device (e.g., the electronic device 101 of FIG. 1) partially overlaps a second obstacle recognition radius 1115 of the vehicle (e.g., the vehicle 201 of FIG. 2), so that the electronic device 101 and the vehicle 201 are interlocked with each other to recognize the obstacle and feedback the risk of collision with the obstacle. The electronic device 101 may recognize the obstacle within the first obstacle recognition radius 1113 by using a microphone (e.g., the sound output module 155 of FIG. 1), a sensor module (e.g., the sensor module 176 of FIG. 1), a camera (e.g., the camera module 180 of FIG. 1), or a communication module (e.g., the communication module 190 of FIG. 1). The vehicle 201 may recognize the obstacle within the second obstacle recognition radius 1115 by using a camera (e.g., the vision camera 310 of FIG. 3), a sensor module (e.g., the sensor module 320 of FIG. 3), or a communication module (e.g., the communication module 360 of FIG. 3). The electronic device 101 may acquire an expected moving path 1107 based on location information of the electronic device 101 (e.g., the location of the user 1101) or location information of the vehicle 201. The electronic device 101 may recognize the obstacle on the expected moving path 1107 and determine a collision risk 1130. The electronic device 101 may collect information from another vehicle 1103 or a bicycle 1105 through the communication module 190 and calculate an expected moving path 1109 of the bicycle 1105 based on the collected information. The electronic device 101 may determine the collision risk 1130 based on the expected moving path 1170 of the electronic device 101 and the expected moving path 1109 of the bicycle 1105.

According to various embodiments, the electronic device 101 may determine whether the gaze of the user 1101 is facing the electronic device 101, and guide the collision risk 1130 through the electronic device 101 or the vehicle 201 based on the user's gaze. When the posture of the electronic device 101 corresponds to a configured posture (e.g., a posture when a user walks and uses the electronic device), when a touch input is detected, or when a specific application is executed, the electronic device 101 may determine that the gaze direction of the user 1101 is facing the electronic device 101. The electronic device 101 may guide the collision risk 1130 through the vehicle 201 when the gaze direction of the user 1101 is facing the electronic device 101. Alternatively, the electronic device 101 may guide the collision risk 1130 through a wearable device connected to the electronic device 101 when the user's gaze direction is facing the electronic device 101. Alternatively, when the user's gaze is facing the electronic device 101, the electronic device 101 may display a risk notification through the display module 160, and when the user's gaze is not facing the electronic device 101, the electronic device 101 may provide vibration for the risk notification through the haptic module 179, or output sound for the risk notification through the sound output module 155.

FIG. 11B is a diagram illustrating another example of guiding a collision risk through an electronic device or a vehicle according to various embodiments.

Referring to FIG. 11A, the second situation 1150 may be a state in which an obstacle is recognized and a notification of an obstacle collision risk is fed back when the first obstacle recognition radius 1113 of the electronic device 101 fully overlaps the second obstacle recognition radius 1115 of the vehicle 201. The electronic device 101 may recognize the obstacle within the first obstacle recognition radius 1113 by using a microphone (e.g., the sound output module 155 of FIG. 1), a sensor module (e.g., the sensor module 176 of FIG. 1), a camera (e.g., the camera module 180 of FIG. 1), or a communication module (e.g., the communication module 190 of FIG. 1). The vehicle 201 may recognize an obstacle 1153 within the second obstacle recognition radius 1115 by using a camera (e.g., the vision camera 310 of FIG. 3), a sensor module (e.g., the sensor module 320 of FIG. 3), or a communication module (e.g., the communication module 360 of FIG. 3). The obstacle 1153 is not included in the first obstacle recognition radius 1113 but included in the second obstacle recognition radius 1115 and may be recognized by the vehicle 201. The vehicle 201 may transmit information on the obstacle 1153 (or obstacle information) to the electronic device 101.

The electronic device 101 may determine a collision risk 1151 with the obstacle 1153 based on the recognized obstacle and obstacle information received from the vehicle 201. The electronic device 101 may control the vehicle 201 to notify of the collision risk 1151 through the vehicle 201. For example, the vehicle 201 may provide the collision risk 1151 by at least one of turning on a light source or outputting sound from a horn 1157. Alternatively, the electronic device 101 may display obstacle guidance information 1155 on the collision risk 1151 through the display module 160. Alternatively, when the user's gaze is not facing the electronic device 101, the electronic device 101 may provide vibration for the risk notification through the haptic module 179, or output sound for the risk notification through the sound output module 155 base on the gaze direction.

An method performed by an electronic device (e.g., the walking support device 301 of FIG. 3) according to various embodiments of the disclosure (e.g., the vehicle 201 of FIG. 2) may include connecting to an external electronic device (e.g., the electronic device 101 of FIG. 1) through a communication module (e.g., the communication module 360 of FIG. 3) of the electronic device, determining an expected moving path by receiving location information of the external electronic device from the external electronic device, recognizing an obstacle on the expected moving path based on at least one of the location information of the external electronic device, an image acquired from a vision camera (e.g., the vision camera 310 of FIG. 3) of the electronic device, a sensor value acquired from a sensor module (e.g., the sensor module 320 of FIG. 3) of the electronic device, or information collected from another device located on a road through the communication module, and determining risk of collision between the external electronic device and the obstacle and providing a risk notification through an output module of the electronic device.

The electronic device may mounted on a vehicle that may include a horn, a first light source disposed on the right side of the vehicle, or a second light source disposed on the left side of the vehicle, and the providing operation may include driving any one of the first light source or the second light source as the risk notification based on at least one of the location of the external electronic device and the location of the obstacle, differ the driving pattern of the first light source and the second light source, or include an operation of driving the first light source, the second light source, and the horn.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a vision camera;
a sensor module;
a communication module;
an output module;
memory, comprising one or more storage media, storing instructions; and
one more processors communicatively connected to the vision camera, the sensor module, the communication module, the output module, and the memory,
wherein the instructions, when executed by the one or more processors individually or collectively, cause the electronic device to:
connect to an external electronic device through the communication module,
receive, from the external electronic device, location information of the external electronic device,
determine an expected moving path of the external electronic device based on the location information,
recognize an obstacle on the expected moving path based on at least one of the location information of the external electronic device, an image acquired from the vision camera, a sensor value acquired from the sensor module, or information collected from another device located on a road through the communication module,
transmit, to the external electronic device, obstacle information about the obstacle,
determine a risk of collision between the external electronic device and the obstacle, and
provide a risk notification through the output module,
wherein when the electronic device recognizes the obstacle, the instructions, when executed by the one or more processors individually or collectively, cause the electronic device to:
recognize an obstacle located within a first distance from the electronic device through an ultrasonic sensor,
recognize an obstacle located within a second distance from the electronic device through the vision camera or a lidar, and
recognize an obstacle located within a third distance from the electronic device through vehicle to everything (V2X) or ultra-wideband (UWB) communication, and wherein the first distance is shorter than the second distance, and the second distance is shorter than the third distance.

2. The electronic device of claim 1, wherein the electronic device is further configured to be mounted on a vehicle and at least one of turn on power of the vehicle, turn on an ignition of the vehicle, or turn on an engine of the vehicle, according to control by the external electronic device.

3. The electronic device of claim 2,
wherein the output module comprises a horn, a first light source disposed on a first side of the vehicle, or a second light source disposed on a second side of the vehicle, and
wherein the instructions, when executed by the one or more processors individually or collectively, further cause the electronic device to at least one of drive the first light source or the second light source differently or output sound from the horn, based on at least one of the location information of the external electronic device or a location of the obstacle.

4. The electronic device of claim 2, wherein the instructions, when executed by the one or more processors individually or collectively, further cause the electronic device to at least one of turn on one of a plurality of light sources that each correspond to a different direction, set an intensity of at least one of the plurality of light sources, or output sound at a sound level from a horn, differently according to a risk level for the risk notification.

5. The electronic device of claim 2, wherein the instructions, when executed by the one or more processors individually or collectively, further cause the electronic device to:
calculate a distance between the electronic device and the recognized obstacle or a speed of the obstacle based on a current location of the external electronic device,
determine whether there will be a collision with an obstacle based on at least one of the distance between the electronic device and the obstacle or the speed of the obstacle, and
provide the risk notification based on a result of the determination.

6. The electronic device of claim 2, wherein the instructions, when executed by the one or more processors individually or collectively, further cause the electronic device to:
receive obstacle information recognized by the external electronic device from the external electronic device, and
determine the risk of collision between the external electronic device and the obstacle based on the recognized obstacle and the received obstacle information.

7. The electronic device of claim 6, wherein the instructions, when executed by the one or more processors individually or collectively, further cause the electronic device to:
acquire high definition (HD) map information from a server, and
determine the risk of collision between the external electronic device and the obstacle further based on the acquired map information.

8. An electronic device comprising:
a sensor module;
a vision camera;
a communication module;
a location recognition module;
memory comprising one or more storage media, storing instructions; and one or more processors communicatively connected to the sensor module, the vision camera, the communication module, the location recognition module, and the memory,
wherein the instructions, when executed by the one or more processors individually or collectively, cause the electronic device to:
acquire location information of the electronic device by using the location recognition module,
identify an expected moving path of the electronic device based on location information of a vehicle stored in the memory and the acquired location information,
recognize an obstacle on the expected moving path based on at least one of the location information of the electronic device, an image acquired from the vision camera, or a sensor value acquired from the sensor module,
provide a risk notification based on the recognized obstacle,
connect to the vehicle when entering within a predetermined distance from the vehicle according to movement of the electronic device, and
provide the risk notification to the vehicle,
wherein when the electronic device recognizes the obstacle, the instructions, when executed by the one or more processors individually or collectively, cause the electronic device to:
recognize an obstacle located within a first distance from the electronic device through an ultrasonic sensor,
recognize an obstacle located within a second distance from the electronic device through the vision camera or a lidar, and
recognize an obstacle located within a third distance from the electronic device through vehicle to everything (V2X) or ultra-wideband (UWB) communication, and
wherein the first distance is shorter than the second distance, and the second distance is shorter than the third distance.

9. The electronic device of claim 8,
wherein the memory is further configured to store a previous moving path acquired based on a location change of the electronic device while moving away from the vehicle, and
wherein the instructions, when executed by the one or more processors individually or collectively, further cause the electronic device to determine the expected moving path further based on the previous moving path.

10. The electronic device of claim 8, wherein the instructions, when executed by the one or more processors individually or collectively, further cause the electronic device to:
provide the risk notification through at least one of a display module, a haptic module, or a speaker in case of not being connected to the vehicle, and
provide the risk notification through the electronic device or the vehicle in case of being connected to the vehicle.

11. The electronic device of claim 8, wherein the instructions, when executed by the one or more processors individually or collectively, further cause the electronic device to:
receive obstacle information from the vehicle when connected to the vehicle, acquire high definition (HD) map information from a server, determine whether there will be a collision between the electronic device and an obstacle based on at least one of the recognized obstacle, the received obstacle information, or the acquired map information, and provide the risk notification based on a result of the determination.

12. The electronic device of claim 8, wherein the instructions, when executed by the one or more processors individually or collectively, further cause the electronic device to:

track a user's gaze direction, provide the risk notification through at least one of a display module, a haptic module, or a speaker in case of the user's gaze direction facing the electronic device, and provide the risk notification through the vehicle in case of the user's gaze direction not facing the electronic device.

13. A method performed by an electronic device, the method comprising:

connecting to an external electronic device through a communication module of the electronic device;

receiving location information of the external electronic device from the external electronic device;

determining an expected moving path of the external electronic device based on the received location information;

recognizing an obstacle on the expected moving path based on at least one of the location information of the external electronic device, an image acquired from a vision camera of the electronic device, a sensor value acquired from a sensor module of the electronic device, or information collected from another device located on a road through the communication module;

transmitting, to the external electronic device, obstacle information about the obstacle;

determining a risk of collision between the external electronic device and the obstacle; and providing a risk notification through an output module of the electronic device, wherein the recognizing the obstacle comprises:

recognizing an obstacle located within a first distance from the electronic device through an ultrasonic sensor, recognizing an obstacle located within a second distance from the electronic device through the vision camera or a lidar, and recognizing an obstacle located within a third distance from the electronic device through vehicle to everything (V2X) or ultra-wideband (UWB) communication, and wherein the first distance is shorter than the second distance, and the second distance is shorter than the third distance.

14. The method of claim 13, further comprising:

at least one of turning on power of a vehicle, turning on an ignition of the vehicle, or turning on an engine of the vehicle, according to control by the external electronic device, wherein the electronic device is mounted on the vehicle.

15. The method of claim 14, wherein the output module comprises a horn, a first light source disposed on a first side of the vehicle, or a second light source disposed on a second side of the vehicle, and wherein the method further comprises:

at least one of driving the first light source or the second light source differently or outputting sound from the horn, based on at least one of the location information of the external electronic device or a location of the obstacle.

16. The method of claim 14, further comprising:

at least one of turning on one of a plurality of light sources that each correspond to a different direction, setting an intensity of at least one of the plurality of light sources, or outputting sound at a sound level from a horn, differently according to a risk level for the risk notification.

17. The method of claim 14, further comprising:

calculating a distance between the electronic device and the recognized obstacle or a speed of the obstacle based on a current location of the external electronic device;

determining whether there will be a collision with an obstacle based on at least one of the distance between the electronic device and the obstacle or the speed of the obstacle; and providing the risk notification based on a result of the determination.

* * * * *